US009445276B2

(12) United States Patent
Krishnamoorthy et al.

(10) Patent No.: US 9,445,276 B2
(45) Date of Patent: Sep. 13, 2016

(54) PREVENTING COEXISTENCE INTERFERENCE THROUGH SMART BAND SELECTION IN MSMA DEVICES

(71) Applicant: QUALCOMM Incorporated, San Diego, CA (US)

(72) Inventors: Parthasarathy Krishnamoorthy, Hyderabad (IN); Reza Shahidi, San Diego, CA (US); Francis Ming-Meng Ngai, Louisville, CO (US); Anand Rajurkar, Hyderabad (IN); Sai Kwok, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 14/279,403

(22) Filed: May 16, 2014

(65) Prior Publication Data

US 2015/0334574 A1 Nov. 19, 2015

(51) Int. Cl.
*H04W 16/14* (2009.01)
*H04W 72/04* (2009.01)
*H04J 11/00* (2006.01)
*H04W 48/16* (2009.01)
*H04W 88/06* (2009.01)

(52) U.S. Cl.
CPC ............ *H04W 16/14* (2013.01); *H04J 11/005* (2013.01); *H04W 48/16* (2013.01); *H04W 72/0453* (2013.01); *H04W 88/06* (2013.01)

(58) Field of Classification Search
None
See application file for complete search history.

(56) References Cited

U.S. PATENT DOCUMENTS

| 8,340,580 | B1 | 12/2012 | Epstein |
| 8,526,388 | B1 | 9/2013 | Kaukovuori et al. |
| 2008/0293394 | A1 | 11/2008 | Silver et al. |
| 2012/0069766 | A1 | 3/2012 | Fu et al. |
| 2012/0082070 | A1 | 4/2012 | Hart et al. |
| 2012/0129457 | A1 | 5/2012 | Linsky |
| 2012/0207040 | A1* | 8/2012 | Comsa .............. H04W 72/1215 370/252 |

(Continued)

FOREIGN PATENT DOCUMENTS

| WO | 2012096949 A1 | 7/2012 |
| WO | 2013066119 A1 | 5/2013 |

OTHER PUBLICATIONS

International Search Report and Written Opinion—PCT/US2015/025995—ISA/EPO—Jul. 22, 2015.

*Primary Examiner* — Hassan Kizou
*Assistant Examiner* — Tejis Daya
(74) *Attorney, Agent, or Firm* — The Marbury Law Group, PLLC

(57) ABSTRACT

Various embodiments leverage the typical manner in which a RAT selects a supported frequency band listed in its acquisition database and the standard communications with its network indicating the supported frequency bands to avoid potential coexistence events with one or more other RATs. In particular, various embodiments include methods for avoiding band interference between RATs operating on a multi-SIM communication device by identifying the frequency bands available to each of the RATs, comparing the identified frequency bands to determine whether any RAT's frequency bands will interfere with one or more other RAT's frequency bands, and in response to determining that there is a possibility of frequency band interference, removing those interfering frequency bands from that RAT's acquisition database. As a result, during standard communications, that RAT will report to its network that it supports only non-interfering frequency bands.

28 Claims, 11 Drawing Sheets

(56) References Cited

U.S. PATENT DOCUMENTS

| | | |
|---|---|---|
| 2012/0213162 A1 | 8/2012 | Koo et al. |
| 2013/0028119 A1* | 1/2013 | Ben-Eli ............... H04W 48/16 370/252 |
| 2013/0029704 A1 | 1/2013 | Koo et al. |
| 2013/0064176 A1 | 3/2013 | Hsu et al. |
| 2013/0165049 A1* | 6/2013 | Ahn ..................... H04B 7/24 455/63.1 |
| 2013/0176885 A1 | 7/2013 | Lee et al. |
| 2013/0303235 A1 | 11/2013 | Zheng et al. |
| 2013/0329639 A1* | 12/2013 | Wietfeldt ............. H04W 88/06 370/328 |
| 2014/0031031 A1 | 1/2014 | Gauvreau et al. |
| 2014/0050146 A1 | 2/2014 | Chrisikos et al. |

* cited by examiner

425

| Frequency Band | Interfering Bands |
|---|---|
| A | Q, S, Y |
| B | R, Z |
| C | S, Y, X |
| Q | A, X |
| R | B, Z |
| S | A, B, Y |
| X | C, Q |
| Y | A, C, S |
| Z | B, R |

FIG. 4B

PREVENTING COEXISTENCE INTERFERENCE THROUGH SMART BAND SELECTION IN MSMA DEVICES

RELATED APPLICATIONS

This application is related to U.S. patent application Ser. No. 14/279,409 entitled "Avoidance of Interference During Simultaneous Multi-Active Technologies in Global Mode," which is filed contemporaneously with this application and is hereby incorporated by reference in its entirety.

BACKGROUND

Some new designs of mobile communication devices—such as smart phones, tablet computers, and laptop computers—include two or more radio access technologies ("RATs") that enable the devices to connect to two or more radio access networks. Examples of radio access networks include GSM, TD-SCDMA, CDMA2000, and WCDMA.

Some mobile communication devices that include a plurality of RATs may also include two or more radio-frequency communication circuits or "RF chains" to provide users with access to multiple separate networks simultaneously. For example, a mobile communication device that includes a plurality of Subscriber Identity Module (SIM) cards that are each associated with a different RAT and utilize a different RF resource to connect to a separate mobile telephony network is termed a "multi-SIM-multi-active" or "MSMA" communication device. An example MSMA communication device is a "dual-SIM-dual-active" or "DSDA" communication device, which includes two SIM cards/subscriptions associated with two mobile telephony networks.

When a mobile communication device includes a plurality of RATs, each RAT on the device may utilize a different RF chain to communicate with its associated network at any time. For example, a first RAT (e.g., a GSM RAT) may use a first transceiver to transmit to a GSM base station at the same time a second RAT (e.g., a WCDMA RAT) uses a second transceiver to transmit to a WCDMA base station. However, because of the proximity of the antennas of the RF chains included in a MSMA communication device, the simultaneous use of the RF chains may cause one or more RF chains to desensitize or interfere with the ability of the other RF chains to operate normally.

Generally, receiver desensitization (referred to as "de-sense"), or degradation of receiver sensitivity, may result from noise interference of a nearby transmitter. For example, when two radios are close together with one transmitting on the uplink—the aggressor communication activity ("aggressor")—and the other receiving on the downlink—the victim communication activity ("victim")—signals from the aggressor's transmitter may be picked up by the victim's receiver or otherwise interfere with reception of a weaker signal (e.g., from a distant base station). As a result, the received signals may become corrupted and difficult or impossible for the victim to decode. Receiver de-sense presents a design and operational challenge for multi-radio devices, such as MSMA communication devices, due to the necessary proximity of transmitters in these devices.

SUMMARY

Various embodiments provide methods, devices, and non-transitory processor-readable storage media for avoiding a coexistence event between radio access technologies (RATs) operating on a multi-Subscriber-Identity-Module (SIM), multi-active communication device.

Some embodiments methods may include obtaining information regarding available frequency bands for a first RAT and a second RAT, determining whether there is a possibility of frequency band interference between the first RAT and the second RAT, and configuring an acquisition database of the first RAT to include only non-interfering frequency bands, in response to determining that there is a possibility of frequency band interference between the first RAT and the second RAT.

In some embodiments, configuring the acquisition database of the first RAT to include only non-interfering frequency bands may include removing interfering frequency bands from the acquisition database of the first RAT before the first RAT reports available frequency bands to a wireless network.

In some embodiments, configuring the acquisition database of the first RAT to include only non-interfering frequency bands may include removing from the acquisition database of the first RAT any frequency bands that interfere with a current frequency band of the second RAT.

In some embodiments, configuring the acquisition database of the first RAT to include only non-interfering frequency bands may include removing from the acquisition database of the first RAT any frequency bands of the first RAT that will interfere with any frequency band available to the second RAT.

In some embodiments, determining whether there is a possibility of frequency band interference between the first RAT and the second RAT may include performing a table lookup of frequency bands available to the first RAT and a current frequency band of the second RAT in a table of interfering frequency bands and determining whether there is a possibility of frequency band interference between the first RAT and the second RAT based on the table lookup.

Some embodiment methods may also include identifying a frequency band to which the second RAT has moved, in response to the second RAT changing its current frequency band, performing a table lookup of frequency bands available to the first RAT and the identified frequency band in a table of interfering frequency bands, determining whether the identified frequency band will interfere with a frequency band available to the first RAT based on the table lookup, configuring the acquisition database of the first RAT to include all frequency bands available to the first RAT, in response to determining that the identified frequency band will not interfere with a frequency band available to the first RAT, and configuring the acquisition database of the first RAT to include only frequency bands that will not interfere with the identified frequency band, in response to determining that the identified frequency band will interfere with a frequency band available to the first RAT.

Some embodiment methods may also include determining whether the first RAT is able to receive adequate service on any band that does not interfere with a current frequency band of the second RAT, and configuring the acquisition database of the first RAT to include all frequency bands available to the first RAT, in response to determining that the first RAT is unable to receive adequate service on any band that does not interfere with the current frequency band of the second RAT.

Some embodiment methods may also include determining again whether the first RAT is able to receive adequate service on any band that does not interfere with the current frequency band of the second RAT and configuring the acquisition database of the first RAT to include only frequency bands that do not interfere with the current frequency band of the second RAT, in response to determining that the first RAT is able to receive adequate service on any band that does not interfere with the current frequency band of the second RAT.

Some embodiment methods may also include performing a table lookup of frequency bands available to the second RAT and a current frequency band of the first RAT in a table of interfering frequency bands, in response to determining that the first RAT is unable to receive adequate service on any band that does not interfere with the current frequency band of the second RAT and configuring an acquisition database of the second RAT to include only bands that do not interfere with the current frequency band of the first RAT. In some embodiments, the method may also include determining whether the second RAT is able to receive adequate service on any band that does not interfere with the current frequency band of the first RAT and configuring the acquisition database of the second RAT to include all frequency bands available to the second RAT, in response to determining that the second RAT is unable to receive adequate service with any band that does not interfere with the current frequency band of the first RAT.

In some embodiments, the first RAT is different than the second RAT.

In some embodiments, the methods include obtaining information regarding available frequency bands for a third RAT, determining whether there is a possibility of frequency band interference between the first RAT and at least one of the second RAT and the third RAT, and configuring the acquisition database of the first RAT to include only non-interfering frequency bands, in response to determining that there is a possibility of frequency band interference between the first RAT and at least one of the second RAT and the third RAT.

In some embodiments, configuring the acquisition database of the first RAT to include only non-interfering frequency bands may include removing from the acquisition database of the first RAT any frequency bands that interfere with a current frequency band of at least one of the second RAT and the third RAT.

In some embodiments, configuring the acquisition database of the first RAT to include only non-interfering frequency bands may include removing from the acquisition database of the first RAT any frequency bands of the first RAT that will interfere with any frequency band available to at least one of the second RAT and the third RAT.

In some embodiments, determining whether there is a possibility of frequency band interference between the first RAT and at least one of the second RAT and the third RAT may include performing a table lookup of frequency bands available to the first RAT and a current frequency band of at least one of the second RAT and the third RAT in a table of interfering frequency bands and determining whether there is a possibility of frequency band interference between the first RAT and at least one of the second RAT and the third RAT based on the table lookup.

In some embodiments, the methods may include identifying a frequency band to which at least one of the second RAT and the third RAT has moved, in response to at least one of the second RAT and the third RAT changing its current frequency band, performing a table lookup of frequency bands available to the first RAT and the identified frequency band in a table of interfering frequency bands, determining whether the identified frequency band will interfere with a frequency band available to the first RAT based on the table lookup, and configuring the acquisition database of the first RAT to include all frequency bands available to the first RAT in response to determining that the identified frequency band will not interfere with a frequency band available to the first RAT.

In some embodiments, the methods may include configuring the acquisition database of the first RAT to include only frequency bands that will not interfere with the identified frequency band in response to determining that the identified frequency band will interfere with a frequency band available to the first RAT.

In some embodiments, the methods may include determining whether the first RAT is able to receive adequate service on any band that does not interfere with a current frequency band of at least one of the second RAT and the third RAT, and configuring the acquisition database of the first RAT to include all frequency bands available to the first RAT in response to determining that the first RAT is unable to receive adequate service on any band that does not interfere with the current frequency band of at least one of the second RAT and the third RAT.

In some embodiments, each of the first RAT, the second RAT, and the third RAT are different RATs.

Various embodiments may include a multi-SIM-multi-active communication device configured with processor-executable instructions to perform operations of the methods described above.

Various embodiments may include a multi-SIM-multi-active communication device having means for performing functions of the operations of the methods described above.

Various embodiments may include non-transitory processor-readable media on which are stored processor-executable instructions configured to cause a processor of a multi-SIM-multi-active communication device to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 4A-4C are example tables including information regarding available, current, and interfering frequency bands for a plurality of RATs operating on a multi-SIM-multi-active communication device according to various embodiments.

DETAILED DESCRIPTION

Figure 1:
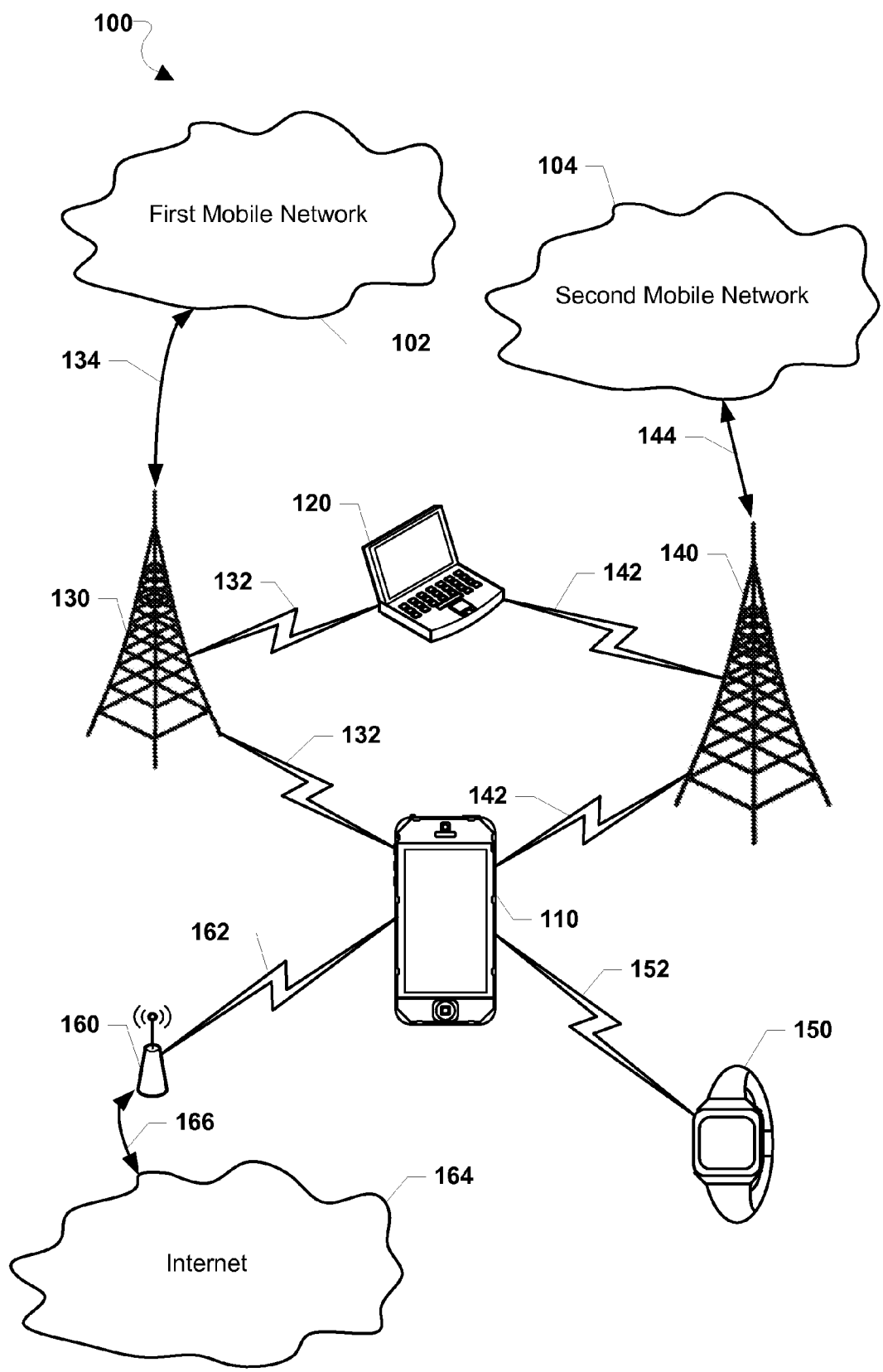
FIG. 1 is a communication system block diagram of mobile telephony networks suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "MSMA communication device" refers to any one or all of cellular telephones, smart phones, personal or mobile multi-media players, personal data assistants, laptop computers, personal computers, tablet computers, smart books, palm-top computers, wireless electronic mail receivers, multimedia Internet-enabled cellular telephones, wireless gaming controllers, and similar personal electronic devices that include a programmable processor, memory, and circuitry for connecting to at least two mobile communication networks. The various aspects may be useful in mobile communication devices, such as smart phones, and so such devices are referred to in the descriptions of various embodiments. However, the embodiments may be useful in any electronic devices, such as a DSDA communication device, that may individually maintain a plurality of RATs that utilize a plurality of separate RF resources.

As described above, one or more subscriptions on a MSMA communication device may negatively affect the performance of other subscriptions operating on the MSMA communication device. For example, a DSDA communication device may suffer from intra-device interference when an aggressor RAT is attempting to transmit while a victim RAT in the DSDA communication device is simultaneously attempting to receive transmissions. During such a "coexistence event," the aggressor RAT's transmissions may cause severe impairment to the victim RAT's ability to receive transmissions. This interference may be in the form of blocking interference, harmonics, intermodulation, and other noises and distortion received by the victim. Such interference may significantly degrade the victim RAT's receiver sensitivity, voice call quality, and data throughput. These effects may also result in a reduced network capacity.

In many conventional solutions implemented on a MSMA communication device for mitigating victim de-sense, the MSMA communication device configures the aggressor RAT to reduce or zero its transmit power while the victim RAT is receiving transmissions (i.e., the device configures the victim to perform transmit ("Tx") blanking) Implementing Tx blanking according to conventional solutions increases the error probability of subsequently received information from the network and decreases the aggressor's overall throughput. Further, these current solutions incur a cost on the link-level performance of the technology being blanked and/or impact the reverse link throughput. While current solutions for utilizing Tx blanking are effective at reducing the victim subscription's de-sense, the improvement to the victim's reception performance is often at the expense of the aggressor subscription's performance.

At any given time, multiple frequency bands/channels may be available to a RAT operating on a communication device, and the RAT may attempt to acquire service from its network using any frequency band included in a list of frequency bands (i.e., the RAT's "acquisition database") determined to be available to that RAT after performing a network search, such as a power band scan. For example, a RAT may sequentially try (or retry) to establish service with each frequency band listed in the RAT's acquisition database until service is established with the RAT's network. Further, in contemporary communication devices, a RAT operating on a contemporary communication device informs its network of the frequency bands it currently supports (i.e., the frequency bands over which the RAT is capable of communicating), and the network responds with information that enables the RAT to begin using a frequency band for communicating.

Some conventional solutions for reducing inter-device de-sense include configuring co-existing radios operating on the same communication device to utilize different operating frequency bands. Specifically, in these solutions, the communication device informs a RAT's network in the event that transmission/reception of radio signals would benefit or no longer benefit from using certain carriers or frequency resources, for example, by signaling the network that certain frequency bands are not useable due to in-device coexistence. In other words, such conventional solutions require the communication device to send other messages to the network—in addition to the standard messages indicating supported frequency bands as described above—to coordinate the frequency bands the network will use when communicating with the communication device.

In other conventional solutions, a network sends a priority list of frequency bands to a RAT operating on a communication device, and when the communication device detects a coexistence interference event, the device sends explicit, additional messaging to the network to ensure that problematic/interfering frequency bands identified on the communication device for the RAT have the lowest priority.

In contrast to conventional solutions, various embodiments of the disclosure enable a RAT to determine when it is at risk of de-sensing or being de-sensed by another RAT to avoid utilizing frequency bands that interfere with the other RAT without additional messaging and without explicitly informing the network of problematic frequency bands that may cause inter-device interference.

Other conventional solutions to inter-device interference/de-sense typically require the communication device to send explicit instructions to a RAT's network requesting the network not to cause the communication device to perform a handover operation back to an interfering frequency band. As discussed, the communication device is required to send these explicit instructions in addition to typical/standard messaging exchanged between the device and the RAT's network.

In contrast to such conventional solutions, various embodiments described in the disclosure enable a MSMA communication device to selectively report a RAT's non-interfering frequencies bands to the RAT's wireless network (i.e., exclude frequency bands that can cause de-sense from the acquisition database reported to the network) in response to determining that the RAT is at risk of de-sensing and/or being de-sensed by another RAT without requiring the RAT and/or the RAT's network to rely on additional/non-standard network communications.

In overview, various embodiments described in the disclosure leverage the typical manner in which a RAT selects a supported frequency band listed in its acquisition database and the standard communications with its network indicating the supported frequency bands to avoid potential coexistence events with one or more other RATs. In particular, various embodiments include methods implemented on a MSMA communication device (e.g., a DSDA communication device) for predicting and avoiding band interference between a plurality of RATs operating on the MSMA communication device by identifying the frequency bands available to each of the plurality of RATs (i.e., based upon the results of a convention frequency scan), comparing the identified frequency bands to determine whether any of a selected RAT's (or RATs') frequency bands will interfere with one or more other RAT's frequency bands and, in response to determining that there is a possibility of frequency band interference, removing those frequency bands or channels from its acquisition database. As a result, during normal/standard communications the selected RAT(s) will report to its network that it supports frequency bands that exclude the interfering frequency bands. By the MSMA communication device reporting support for only non-interfering frequency bands, the standard processes by which networks and RATs coordinate communication channels will avoid potentially problematic/interfering frequency bands, thereby avoiding de-sense (instead of reacting to de-sense) without the need for additional network messaging, or changes to network protocols or procedures.

In some embodiments, a processor operating on the MSMA communication device may select one or more of the RATs on the device (referred to herein as a "selected RAT" or a "first RAT") to have its interfering frequency bands removed from its acquisition database in order to avoid de-sensing of the other RAT or RATs (referred to herein as a "non-selected RAT" or a "second RAT"). For example, the device processor may select the RAT supporting a lower priority subscription (e.g., as designated by the user) as the selected RAT (or first RAT) that will limit its available frequency bands in order to avoid interfering with a higher priority subscription supported by the non-selected RAT (or second RAT).

In various embodiments, the device processor may monitor the frequency band being utilized by the non-selected RAT to determine whether the non-selected RAT has moved to another frequency band, such as when the non-selected RAT moves to a new frequency band as it moves from cell to cell to improve service. In response to determining that the non-selected RAT has moved to another frequency band, the device processor may determine whether any of the selected RAT's available frequency bands will interfere with the non-selected RAT's new frequency band. This determination may be made by using the non-selected RAT's frequency band in a table look up operation on a data table of interfering frequency bands stored in memory of the MSMA communication device to determine whether any interfering frequency bands identified in the data table match any of the selected RAT's available frequency bands (e.g., as frequency bands in its current acquisition database). In response to determining that the selected RAT's available frequency bands are not at risk of interfering with the non-selected RAT's current frequency band (i.e., none of the selected RAT's available frequency bands will interfere with the non-selected RAT's frequency band), all of the selected RAT's available frequency bands may be included in its acquisition database, which may involve adding back frequency bands that were previously removed. However, in response to determining that one or more of the selected RAT's available frequency bands is at risk of interfering with the non-selected RAT's current frequency band (i.e., one or more of the selected RAT's available frequency bands will interfere with the non-selected RAT's frequency band), the identified interfering frequency band(s) may be removed from the acquisition database of the selected RAT. Because the RATs report their available frequency bands included in the acquisition database to their respective wireless network, the result of the various embodiments will be that the network of the selected RAT will not direct it to use an interfering frequency band. Thus, the MSMA communication device, and not the networks, takes actions to preempt interference by the two or more RATs on operating on the device.

In some embodiments, the process of identifying interfering frequency bands and removing them from the acquisition database of the selected RAT may be performed for all available frequency bands of the non-selected RAT. These embodiments ensure that if the non-selected RAT changes to a different frequency band, the selected RAT will not interfere. In such embodiments, the frequency bands in the acquisition database of the non-selected RAT may be used in a table look up to identify all potentially interfering frequency band combinations, and any identified interfering frequency bands may be removed from the acquisition database of the selected RAT. Such embodiments may repeat the process of identifying and removing interfering frequency bands from the acquisition database of the selected RAT and may be performed periodically and/or whenever a RAT updates its acquisition database.

In some embodiments, the device processor may determine whether the selected RAT is able to receive adequate service on a non-interfering frequency band remaining in its acquisition database after interfering frequency bands have been removed. In other words, the device process may assess whether at least one non-interfering frequency band frequency in the selected RAT's acquisition database has sufficient quality of service to support the selected RAT's communications, such as whether any frequency band meets a given quality threshold. In response to determining that the selected RAT is unable to receive adequate service on a non-interfering frequency band, the device processor may configure the selected RAT to include all available frequency bands—including both interfering and non-interfering frequency bands—in its acquisition database. In other words, the device processor may cause the selected RAT to revert to normal operations when an acceptable communication link cannot be maintained using non-interfering frequency bands. In further embodiments, in response to reverting the selected RAT to normal operations, the device processor may continually check whether the selected RAT is able to receive adequate service on a non-interfering frequency band (i.e., whether the quality of service available on a non-interfering frequency band has improved sufficiently to enable acceptable communication). When the selected RAT is able to receive adequate service on a non-interfering frequency band, the device processor may again remove interfering frequency bands from the acquisition database of the selected RAT. As a result, through normal reporting of available frequency bands to the network, the network will direct the selected RAT to use a non-interfering frequency band as part of standard cellular network operations.

In some embodiments, in response to determining that the selected RAT is unable to receive adequate service on a non-interfering frequency band, the device processor may essentially switch the RAT whose acquisition database is trimmed of interfering frequency bands in an attempt to find a compatible combination of frequency bands. Thus, in such embodiments, when no acceptable non-interfering frequency band is available in the selected RAT, the processor may revert the acquisition database of the selected RAT to normal operations so that in includes all available frequency bands, and identify and remove frequency bands from the acquisition database of the non-selected RAT that interfere with the current frequency band of the selected RAT. In other words, when no two compatible frequency bands for the two RATs can be identified be removing interfering frequency bands for the acquisition database of the selected RAT, process may be repeated with the previously non-selected RAT becoming the selected RAT and vice versa.

Various embodiments may be implemented within a variety of communication systems 100 that include at least two mobile telephony networks, an example of which is illustrated in FIG. 1. A first mobile network 102 and a second mobile network 104 typically each include a plurality of cellular base stations (e.g., a first base station 130 and a second base station 140). A first MSMA communication device 110 may be in communication with the first mobile network 102 through a cellular connection 132 to the first base station 130. The first MSMA communication device 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144.

A second MSMA communication device 120 may similarly communicate with the first mobile network 102 through the cellular connection 132 to the first base station 130. The second MSMA communication device 120 may communicate with the second mobile network 104 through the cellular connection 142 to the second base station 140. The cellular connections 132 and 142 may be made through two-way wireless communication links, such as 4G, 3G, CDMA, TDMA, WCDMA, GSM, and other mobile telephony communication technologies.

While the MSMA communication devices 110, 120 are shown connected to the mobile networks 102, 104, in some embodiments (not shown), the MSMA communication devices 110, 120 may include two or more subscriptions to two or more mobile networks 102, 104 and may connect to those subscriptions in a manner similar to those described above.

In some embodiments, the first MSMA communication device 110 may establish a wireless connection 152 with a peripheral device 150 used in connection with the first MSMA communication device 110. For example, the first MSMA communication device 110 may communicate over a Bluetooth® link with a Bluetooth-enabled personal computing device (e.g., a "smart watch"). In some embodiments, the first MSMA communication device 110 may establish a wireless connection 162 with a wireless access point 160, such as over a Wi-Fi connection. The wireless access point 160 may be configured to connect to the Internet 164 or another network over a wired connection 166.

While not illustrated, the second MSMA communication device 120 may similarly be configured to connect with the peripheral device 150 and/or the wireless access point 160 over wireless links.

Figure 2:
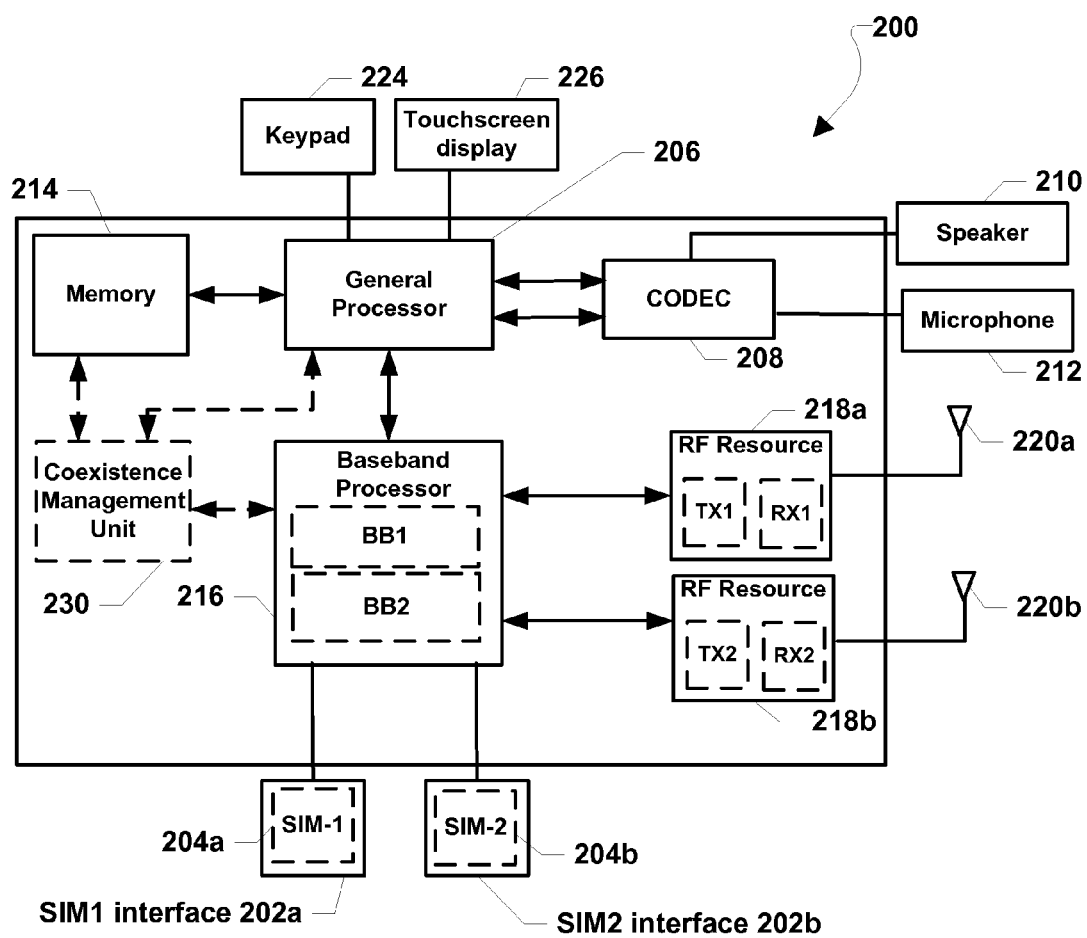
FIG. 2 is a component block diagram of a multi-SIM-multi-active communication device according to various embodiments.

FIG. 2 is a functional block diagram of a MSMA communication device 200 suitable for implementing various embodiments. According to various embodiments, the MSMA communication device 200 may be similar to one or more of the MSMA communication devices 110, 120 as described with reference to FIG. 1. With reference to FIGS. 1-2, the MSMA communication device 200 may include a first SIM interface 202a, which may receive a first identity module SIM-1 204a that is associated with a first subscription. The MSMA communication device 200 may also include a second SIM interface 202b, which may receive a second identity module SIM-2 204b that is associated with a second subscription.

A SIM in various embodiments may be a Universal Integrated Circuit Card (UICC) that is configured with SIM and/or USIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. Each SIM card may have a CPU, ROM, RAM, EEPROM and I/O circuits.

A SIM used in various embodiments may contain user account information, an international mobile subscriber identity (IMSI), a set of SIM application toolkit (SAT) commands, and storage space for phone book contacts. A SIM card may further store home identifiers (e.g., a System Identification Number (SID)/Network Identification Number (NID) pair, a Home PLMN (HPLMN) code, etc.) to indicate the SIM card network operator provider. An Integrated Circuit Card Identity (ICCID) SIM serial number is printed on the SIM card for identification. However, a SIM may be implemented within a portion of memory of the MSMA communication device 200 (e.g., memory 214), and thus need not be a separate or removable circuit, chip or card.

The MSMA communication device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer readable storage medium that stores processor-executable instructions. For example, the instructions may include routing communication data relating to the first or second subscription though a corresponding baseband-RF resource chain.

The memory 214 may store an operating system (OS), as well as user application software and executable instructions. The memory 214 may also store application data, such as an array data structure.

The general processor 206 and the memory 214 may each be coupled to at least one baseband modem processor 216. Each SIM in the MSMA communication device 200 (e.g., the SIM-1 204a and the SIM-2 204b) may be associated with a baseband-RF resource chain. A baseband-RF resource chain may include the baseband modem processor 216, which may perform baseband/modem functions for communicating with/controlling a RAT, and may include one or more amplifiers and radios, referred to generally herein as RF resources 218a, 218b. In some embodiments, baseband-RF resource chains may share the baseband modem processor 216 (i.e., a single device that performs baseband/modem functions for all SIMs on the MSMA communication device 200). In other embodiments, each baseband-RF resource chain may include physically or logically separate baseband processors (e.g., BB1, BB2).

In some embodiments, the RF resources 218a, 218b may be associated with different RATs. For example, a first RAT (e.g., a GSM RAT) may be associated with the RF resource 218a, and a second RAT (e.g., a CDMA or WCDMA RAT) may be associated with the RF resource 218b. The RF resources 218a, 218b may each be transceivers that perform transmit/receive functions on behalf of their respective RATs. The RF resources 218a, 218b may also include separate transmit and receive circuitry, or may include a transceiver that combines transmitter and receiver functions. The RF resources 218a, 218b may each be coupled to a wireless antenna (e.g., a first wireless antenna 220a or a second wireless antenna 220b). The RF resources 218a, 218b may also be coupled to the baseband modem processor 216.

In some embodiments, the general processor 206, the memory 214, the baseband processor(s) 216, and the RF resources 218a, 218b may be included in the MSMA communication device 200 as a system-on-chip. In some embodiments, the first and second SIMs 202a, 202b and their corresponding interfaces 204a, 204b may be external to the system-on-chip. Further, various input and output devices may be coupled to components on the system-on-chip, such as interfaces or controllers. Example user input components suitable for use in the MSMA communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the MSMA communication device 200 to enable communication between them, as is known in the art.

Functioning together, the two SIMs 204a, 204b, the baseband modem processor 216, the RF resources 218a, 218b, and the wireless antennas 220a, 220b may constitute two or more RATs. For example, a SIM, baseband processor, and RF resource may be configured to support two different radio access technologies, such as GSM and WCDMA. More RATs may be supported on the MSMA communication device 200 by adding more SIM cards, SIM interfaces, RF resources, and/or antennae for connecting to additional mobile networks.

The mobile communication device 200 may include a coexistence management unit 230 configured to manage and/or schedule the RATs' utilization of the RF resources 218a, 218b. In some embodiments, the coexistence management unit 230 may be implemented within the general processor 206. In some embodiments, the coexistence management unit 230 may be implemented as a separate hardware component (i.e., separate from the general processor 206). In some embodiments, the coexistence management unit 230 may be implemented as a software application stored within the memory 214 and executed by the general processor 206. The coexistence management unit 230 may configure acquisition databases of one or more selected RAT(s) to include only non-interfering frequency bands as further described in the disclosure.

Figure 3:
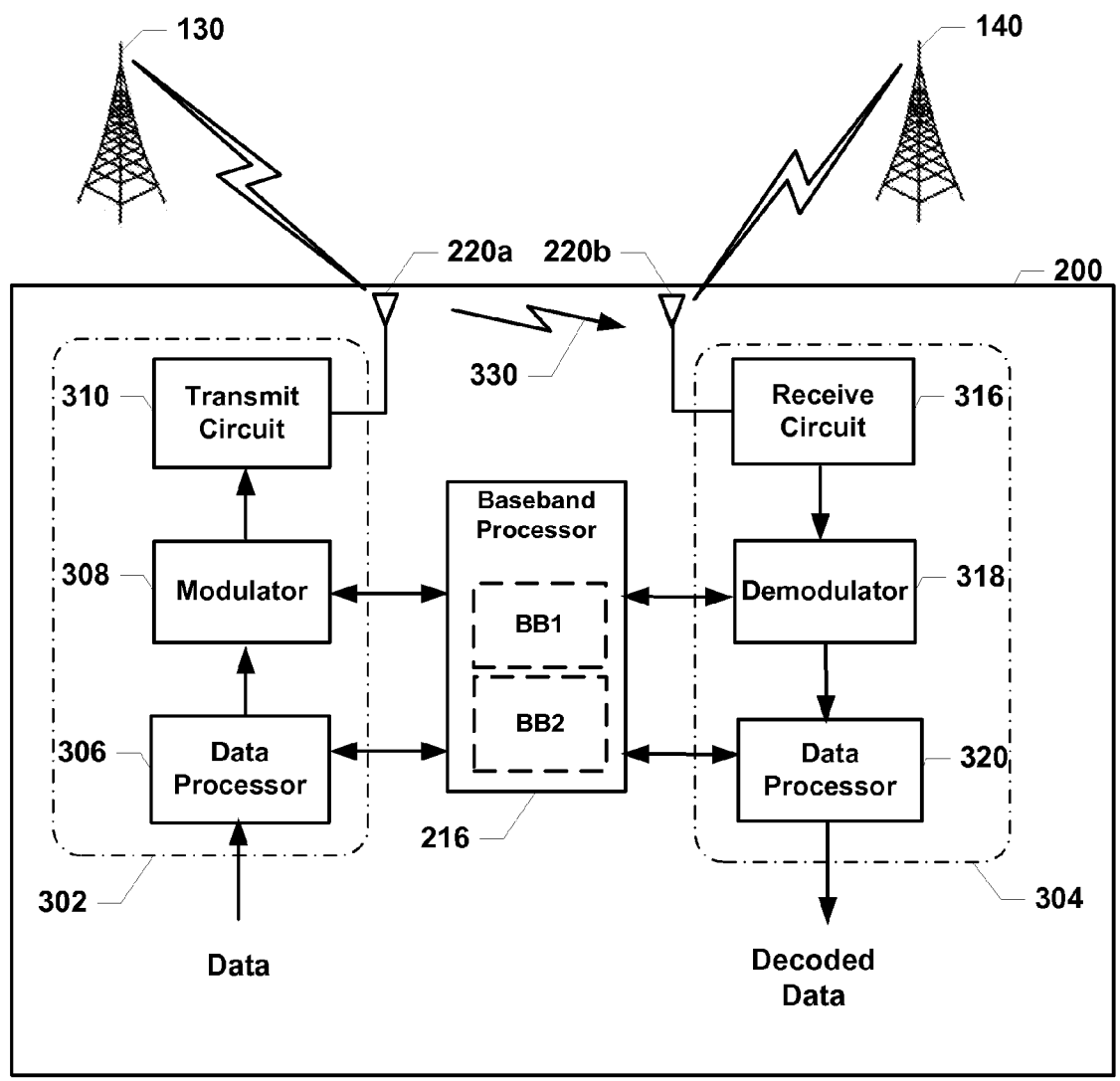
FIG. 3 is a component block diagram illustrating the interaction between components of different transmit/receive chains in a multi-SIM-multi-active communication device according to various embodiments.

FIG. 3 is a block diagram of transmit and receive components in separate RF resources on the MSMA communication device 200 described with reference to FIGS. 1-2, according to various embodiments. With reference to FIGS. 1-3, for example, a transmitter 302 may be part of the RF resource 218a, and a receiver 304 may be part of the RF resource 218b. In some embodiments, the transmitter 302 may include a data processor 306 that may format, encode, and interleave data to be transmitted. The transmitter 302 may include a modulator 308 that modulates a carrier signal with encoded data, such as by performing Gaussian minimum shift keying (GMSK). One or more transmit circuits 310 may condition the modulated signal (e.g., by filtering, amplifying, and upconverting) to generate an RF modulated signal for transmission. The RF modulated signal may be transmitted, for example, to the first base station 130 via the first wireless antenna 220a.

At the receiver 304, the second wireless antenna 220b may receive RF modulated signals from the second base station 140. However, the second wireless antenna 220b may also receive some RF signaling 330 from the transmitter 302, which may ultimately compete with the desired signal received from the second base station 140. One or more receive circuits 316 may condition (e.g., filter, amplify, and downconvert) the received RF modulated signal, digitize the conditioned signal, and provide samples to a demodulator 318. The demodulator 318 may extract the original information-bearing signal from the modulated carrier wave, and may provide the demodulated signal to a data processor 320. The data processor 320 may de-interleave and decode the signal to obtain the original, decoded data, and may provide decoded data to other components in the MSMA communication device 200. Operations of the transmitter 302 and the receiver 304 may be controlled by a processor, such as the baseband modem processor 216. In various embodiments, each of the transmitter 302 and the receiver 304 may be implemented as circuitry that may be separated from their corresponding receive and transmit circuitries (not shown). Alternatively, the transmitter 302 and the receiver 304 may be respectively combined with corresponding receive circuitry and transmit circuitry, for example, as transceivers associated with the SIM-1 204a and the SIM-2 204b.

Receiver de-sense may occur when transmissions by a first RAT on the uplink (e.g., the RF signaling 330) interferes with receive activity on a different transmit/receive chain associated with a second RAT. The signals received by the second RAT may become corrupted and difficult or impossible to decode as a result of the de-sense or interference. Further, noise from the transmitter 302 may be detected by a power monitor (not shown) that measures the signal strength of surrounding cells, which may cause the MSMA communication device 200 to falsely determine the presence of a nearby cell site.

Figure 4A:
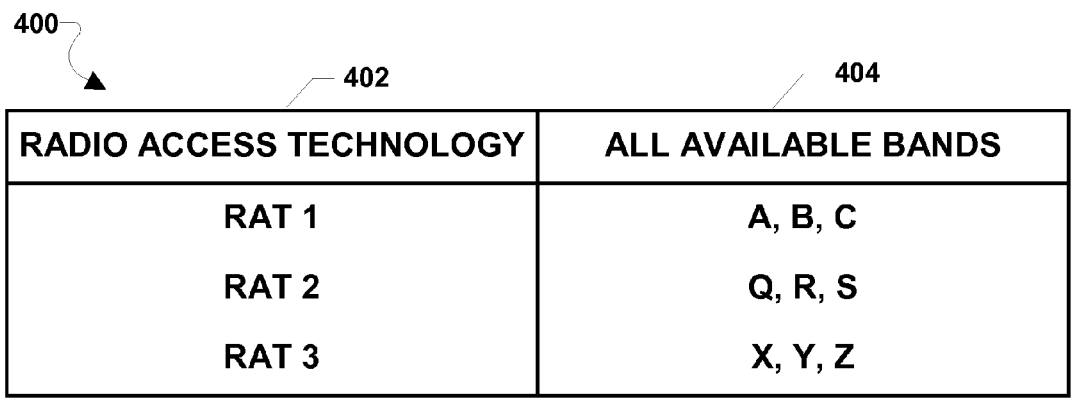
Figure 4C:
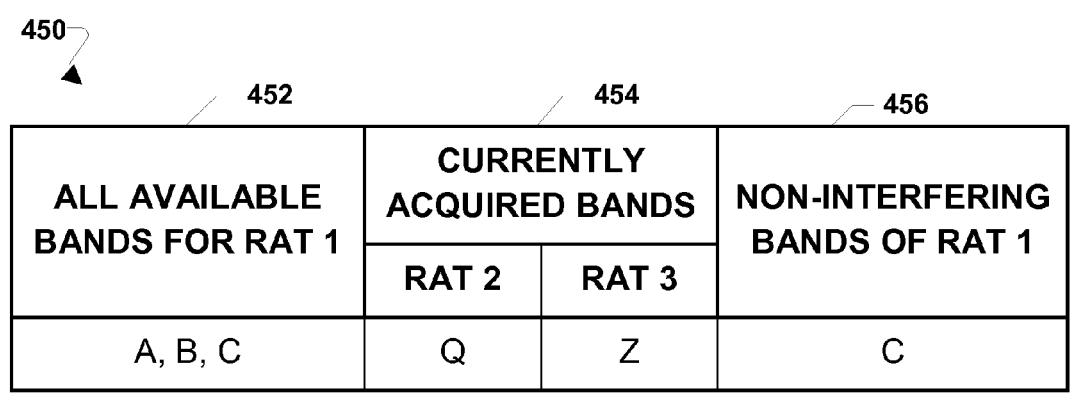

As described, a processor of a MSMA communication device may anticipate when interference will occur between two frequency bands by performing a table look up operation on a data table stored in the device. FIGS. 4A-4C illustrates example data tables 400, 425, 450 that may be used in such an operation in a three-RAT MSMA communication device (e.g., the MSMA communication devices 110, 120, 200 described above with reference to FIGS. 1-3). In other embodiments, tables (not shown) may be provided for MSMA communication devices having a different number of RATs.

With reference to FIGS. 1-4C, in some embodiments, acquisition database table 400 lists available frequency bands in a column 404 associated with each of three RATs of the MSMA communication device listed in a column 402. The available frequency bands associated with a particular RAT may be obtained, for example, by performing a frequency scan to detect the frequency bands of a network corresponding to the particular RAT that can be received. As described, the particular RAT reports the detected frequency bands to its network, which then directs that RAT to use a selected one of the identified frequency bands to communicate with the network. For example, a quad-band GSM RAT may be preconfigured to acquire one of four distinct bands, such as one of 850, 900, 1800, and 1900 MHz, for communicating with a GSM mobile network. In some embodiments, the device processor (e.g., the general processor 206, the baseband modem processor 216, the coexistence management unit 230, a separate controller, and/or the like) may receive information regarding available frequency bands of each RAT operating on the MSMA communication device directly from each of those RATs.

The example acquisition database table 400 lists the frequency bands available to each of three RATs operating on the MSMA communication device. The information may indicate that a first RAT operating on the MSMA communication device (labeled in FIG. 4A as "RAT 1") is receiving signals from and thus is capable of utilizing bands A, B, and C; that a second RAT on the device (labeled in FIG. 4A as "RAT 2") is receiving signals from and thus is capable of utilizing bands Q, R, and S; and that a third RAT on the device (labeled in FIG. 4A as "RAT 3") is receiving signals from and thus is capable of utilizing bands X, Y, and Z. During normal/standard operations, each of the first, second, and third RATs may report support for all available frequency bands to their respective networks as part of the RATs' standard network communications and attempt to acquire service with one of the available frequency bands.

However, as shown in frequency interference data table 425, the first, second, and third RATs may be capable of using frequency bands that interfere with each other, thereby introducing the possibility of a coexistence event occurring on the MSMA communication device.

The frequency interference data table 425 may include information that the device processor can use to determine whether any of a particular RAT's available frequency bands will interfere with the frequency band being used by another RAT (or in some embodiments, any of the frequency bands available to the other RAT) on the MSMA communication device. A frequency interference data table or database may be organized in any of a variety of data structure formats. The example frequency interference data table 425 (illustrated in the FIG. 4B) is a simple data table in which a first frequency band can be used as a look up data field to determine the frequency bands that will interfere with that frequency band. For example, if a non-selected RAT is operating on frequency band R, the device processor may use the data table to determine that frequency bands B and Z will interfere. Thus, by using the frequency interference data table 425, the device processor may easily determine the frequency bands that should be removed from the acquisition database for the selected RAT in order to avoid the potential for interference.

In some embodiments, two bands may interfere with each other in the event that the frequency bands are the same, overlap, and/or otherwise have characteristics (e.g., being harmonics or subharmonics thereof) known to cause interference with each other. Such interference can be determined in advance by a manufacturer of the MSMA communication device, a manufacturer of the modems, network operators, independent parties (e.g., protocol organization, independent testing labs, etc.), and/or the like. Thus, the frequency interference data table 425 may be predefined and loaded in memory (e.g., 214) of the MSMA communication device, within one or more of the SIMs, or within a modem within the device. In some embodiments the MSMA communication device may be configured to generate a frequency interference data table by recognizing when de-sense is occurring and recording the frequency bands in use at the time by each of the RATs.

By generating or accessing the information related to band interference in the information listed in the frequency interference data table 425, the device processor may remove from the acquisition database of selected RATs those frequency bands that will interfere with the current (or any) frequency bands of other RATs, thereby preventing the possibility of coexistence events occurring on the MSMA communication device.

For example (e.g., refer to FIG. 4C), the first RAT (RAT 1) is selected (i.e., is the selected RAT) and has available to it three frequency bands, A, B and C as illustrated in column 452, while the non-selected RATs (RAT 2 and RAT 3) have camped on frequency bands Q and Z, respectively, as illustrated in column 454. Using the frequency interference data table 425, the processor of the MSMA communication device may determine that frequency band A available to the selected RAT could interfere with frequency band Q that RAT 2 is using, and that frequency band B available to the selected RAT could interfere with frequency band Z that RAT 3 is using. Having made these determinations, the device processor may remove interfering frequency bands A and B from the acquisition database of RAT 1 as illustrated in column 456. Accordingly, when RAT 1 reports its available frequency bands to its network, RAT 1 will only report that frequency band C is available, and as a result the network will direct RAT 1 to utilize that frequency band, which will not interfere with the other two RATs (i.e., the non-selected RATs) on the MSMA communication device.

In some embodiments, the device processor may generate the data table 450, which includes information on all available frequency bands for the selected RAT (column 452) and a modified acquisition database (column 456), so that when conditions change and interference is no longer of concern, available frequency bands listed in column 452 may be copied to the modified acquisition database (column 456) without having to perform another frequency scan to repopulate the database. Also, if no non-interfering frequency band listed in the modified acquisition database (column 456) exhibits acceptable signal quality such that convention methods for managing de-sense are to be implemented, available frequency bands may be copied from the full list of available frequency bands in column 452 to the modified acquisition database (column 456) without having to perform another frequency scan to repopulate the database.

While the first RAT is the selected RAT in the discussed example, any of the RATs may be the selected RAT, and the selected RAT may change with time, depending upon operating conditions, activities of the various RATs, and user inputs.

Figure 5A:
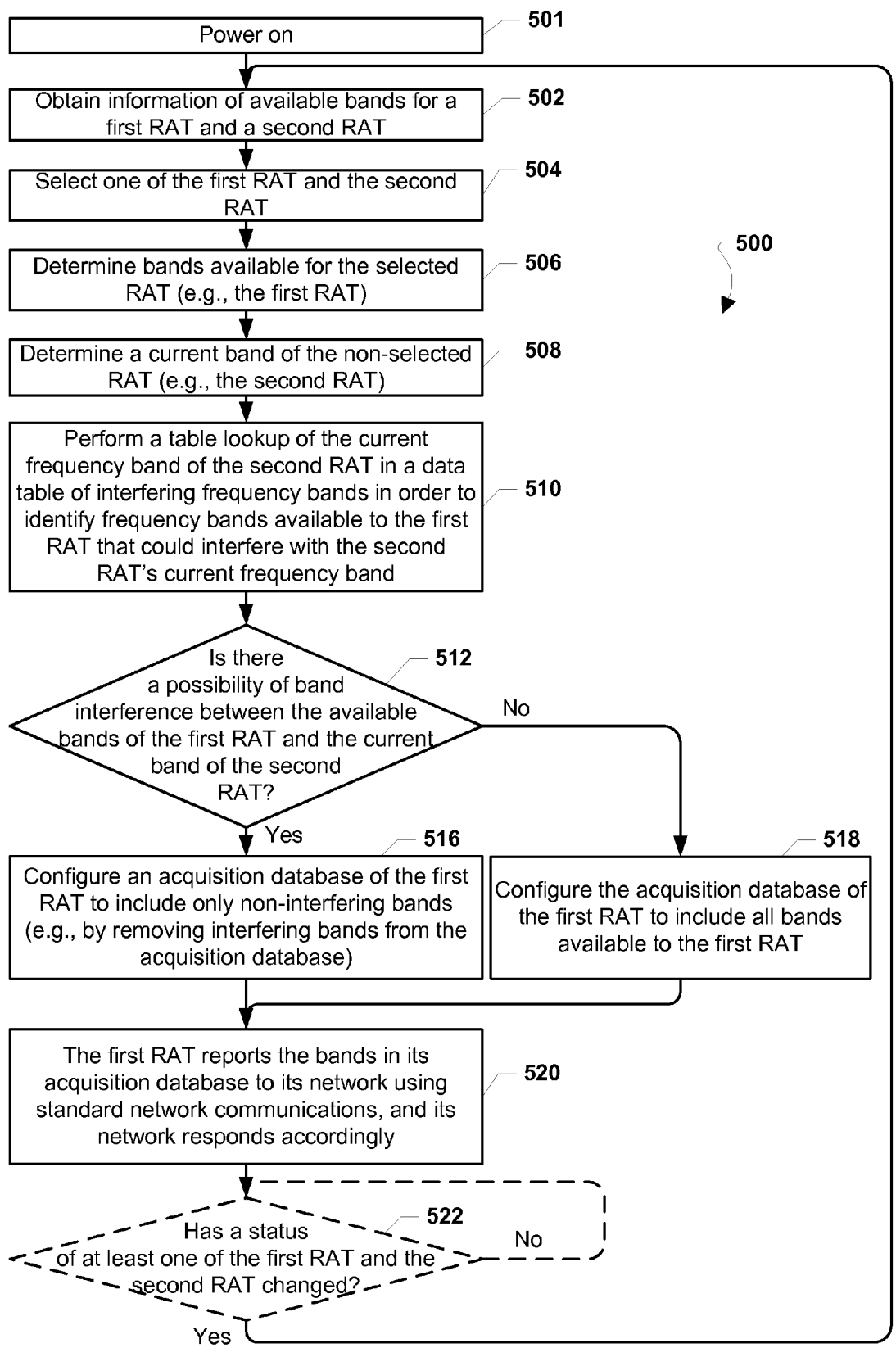
FIG. 5A is a process flow diagram illustrating a method for configuring a selected RAT to avoid bands determined to interfere with a current frequency band of another RAT according to various embodiments.

FIG. 5A illustrates a method 500 for implementing a smart band selection algorithm with a processor (e.g., the general processor 206 of FIG. 2, the baseband modem processor 216, the coexistence management unit 230, a separate controller, and/or the like) executing on a two-RAT MSMA communication device (e.g., the MSMA communication device 200 described above with reference to FIGS. 2-3) to avoid a coexistence event between a first RAT and a second RAT operating on the MSMA communication device. Thus, with reference to FIGS. 1-5A, the device processor may begin performing operations of the method 500 in response to the MSMA communication device's powering on in block 501.

In block 502, the device processor may obtain information regarding available frequency bands for the first RAT and the second RAT. In some embodiments, the device processor may receive a separate list of available frequency bands directly from each of the first RAT and the second RAT, such as following a frequency scan by each RAT. In some embodiments, the device processor may retrieve a predefined list of frequency bands available to the first RAT and the second RAT, respectively, such as a list of frequency bands included in the MSMA communication device by an original equipment manufacturer, in provisioning data stored in one or more SIMs, downloaded from the network device (e.g., a network server), and/or input manually by a user of the MSMA communication device.

The device processor may select one of the two RATs that will have its acquisition database modified to remove interfering frequency bands in block 504. In some embodiments, the device processor may select the one of the two RATs in block 504 based on the respective priorities of the subscriptions supported by those RATs. For example, the device processor may select the first RAT upon determining that the second RAT has a higher priority because the subscription supported by second RAT is scheduled to perform critical transmission or reception activities (e.g., receiving an emergency call) while the first RAT is scheduled to perform lower priority transmission or reception activities. As another example, the device processor may select the first RAT upon determining that the second RAT has a higher priority because the subscription supported by the second RAT is associated with a "business" account while the first RAT is associated with a "home/personal" account, and the user may have previously input a setting that ensures that business communications take precedence over personal communications. In other words, the device processor may select the RAT with a lower priority for trimming that RAT's acquisition database. In some embodiments, the device processor may select the RAT for trimming the acquisition database based on various other criteria, such as the type of RAT (e.g., selecting a GSM RAT instead of a WCDMA RAT).

For ease of reference, the selected RAT is referred to in the following description as the first RAT and the non-selected RAT is referred to as the second RAT. However, these references are merely for ease of description and not intended to imply or require a particular RAT to be selected or non-selected. For example, in some embodiments (e.g., as described with reference to FIG. 8), the second RAT may become the selected RAT in the event that the first RAT is unable to obtain adequate service on a frequency band that does not interfere with the current frequency band of the second RAT.

In block 506, the device processor may determine the frequency bands available for the selected RAT (e.g., the first RAT). For example, the device processor may access the acquisition database populated by a recent frequency scan or downloaded from the network received in or generated from information received in block 502. The device processor may determine a current frequency band of the non-selected RAT (e.g., the second RAT), in block 508. In some embodiments, the second RAT may operate normally, such as by acquiring a frequency band according to known methods.

In block 510, the device processor may perform a table lookup of the current frequency band of the second RAT in a data table of interfering frequency bands in order to identify frequency bands available to the first RAT that could interfere with the second RAT's current frequency band. For example (and as described with reference to FIGS. 4A-4C), the device processor may compare the current frequency band of the second RAT (e.g., the second RAT's band Q) with the available frequency bands of the first RAT (e.g., the first RAT's bands A, B, and C) to determine whether any of the first RAT's available frequency bands interfere with the second RAT's current frequency band.

Based on the table lookup performed in block 510, the device processor may determine whether there is a possibility of frequency band interference between the current frequency band of the second RAT and frequency bands available to the first RAT, in determination block 512. In some embodiments, the operations of blocks 510 and 512 may be performed in a single operation.

In response to determining that there is not a possibility of frequency band interference between the first RAT and the second RAT (i.e., determination block 512="No"), the device processor may configure the acquisition database of the first RAT to include all of the first RAT's available frequency bands, in block 518, thereby enabling the first RAT to acquire service using any frequency band available to it. In the event that the acquisition database of the first RAT was previously trimmed to remove interfering frequency bands, the operations in block 518 may include adding back in previously removed available frequency bands. When the first RAT's acquisition database already includes all available frequency bands, no actions may be taken in block 518.

In response to determining that there is a possibility of frequency band interference between the first RAT and the second RAT (i.e., determination block 512="Yes"), the device processor may configure the acquisition database of the first RAT to include only frequency bands determined not to interfere with the current frequency band of the second RAT, in block 516, such as by removing the identified potentially interfering available frequency bands from the acquisition database of the first RAT. In some embodiments, the device processor may generate/build the acquisition database of the first RAT from scratch and may only include the first RAT's non-interfering frequency bands. In some embodiments, the device processor may remove interfering frequency bands from the acquisition database of the first RAT before the first RAT reports available frequency bands to its wireless network. For example, once the MSMA communication device powers up in block 501, the device processor may perform the operations in block 516 before the first SIM communicates with its wireless network, thereby ensuring that the possibility of frequency band interference between the first RAT and the second RAT does not occur.

Regardless of whether the device processor determines that there is a possibility of frequency band interference in determination block 512, the first RAT will report to its network the frequency bands listed in its acquisition databases pursuant to known network messaging protocols, and the network may respond via messaging known in the art, in block 520.

In optional determination block 522, the device processor may determine whether a status of one or both of the first and second RATs has changed. The status of the second RAT may change when the second RAT performs a handoff operation from its current frequency band to a new frequency band (e.g., as described with reference to FIG. 6). Also, the status of both RATs will change over time as the MSMA communication device moves, because the available frequency bands will change as previously accessible cell towers go out of reception range and other cell towers come into reception range. As the current frequency band of the second RAT changes with cell handoffs, and as the available frequency bands available to the first RAT change, the potential for interfering frequency bands will change. Consequently, the process of preemptively identifying and removing interfering frequency bands from the acquisition database of the select RAT may be repeated whenever there is a change in status of one or both RATs.

In some embodiments, the status of the first RAT may change in response to a determination that the first RAT is unable to receive an acceptable service using the non-interfering frequency bands currently included in its acquisition database. In such embodiments, the device processor may configure the first RAT to resume normal operations until the first RAT is able to receive adequate service on a non-interfering frequency band (e.g., as described with reference to FIG. 7). In some embodiments, the status of the second RAT may also change as the device processor may configure the second RAT to include only frequency bands that do not interfere with the first RAT's current frequency band in response to determining that the first RAT is unable to receive adequate service on a non-interfering frequency band (e.g., as described with reference to FIG. 8).

So long as the status of at least one of the first RAT and the second RAT has not changed (i.e., optional determination block 522="No"), the device processor may continue to monitor for a change in status in optional determination block 522. In response to determining that the status of one or both of the first RAT and the second RAT has changed (i.e., optional determination block 522="Yes"), the device processor may repeat the operations described above by receiving updated information regarding the available frequency bands for the first RAT and the second RAT in block 502.

Figure 5B:
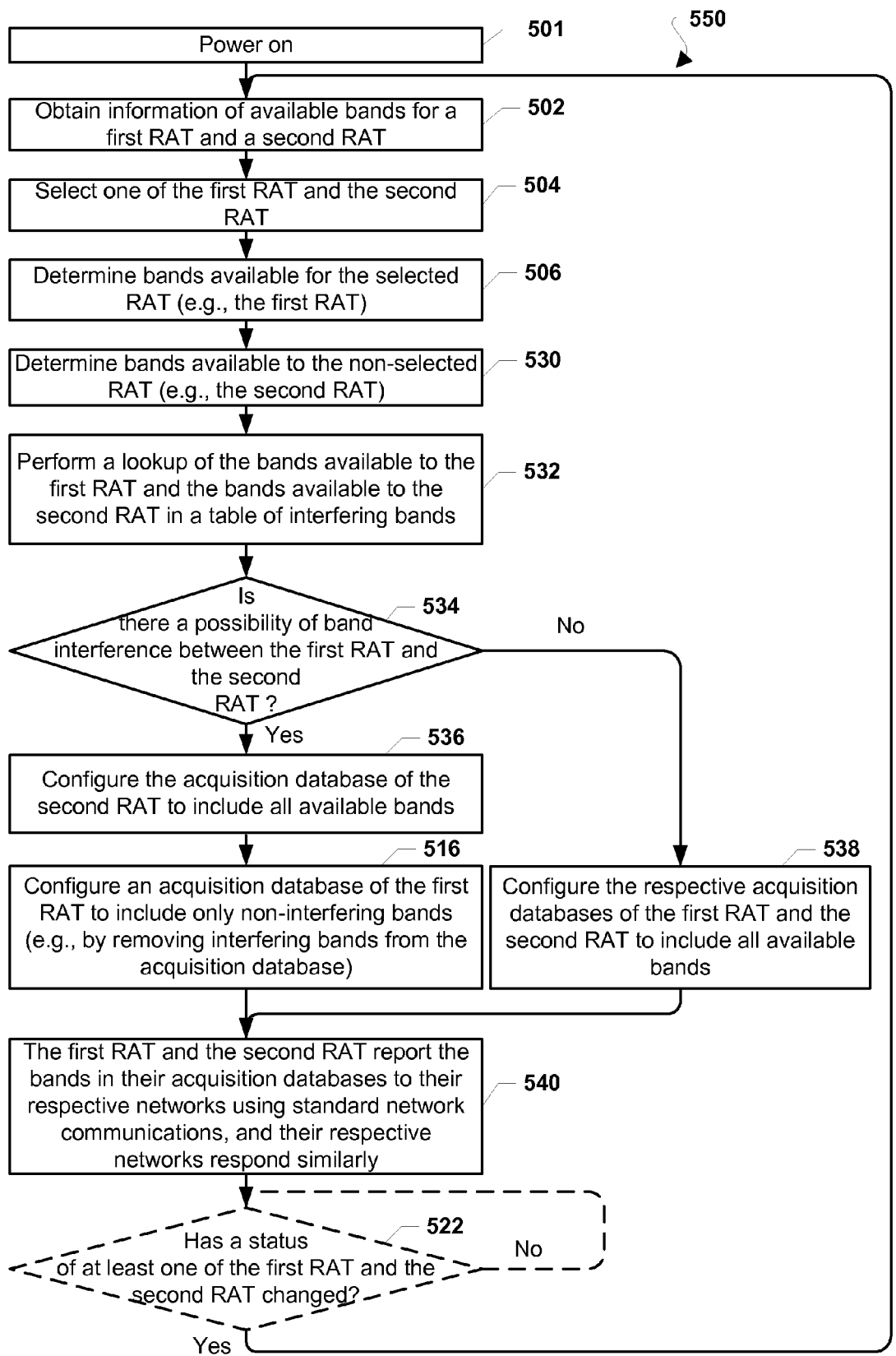
FIG. 5B is a process flow diagram illustrating a method for configuring a selected RAT to avoid bands determined to interfere with any frequency bands available to another RAT according to various embodiments.

As described, in some embodiments, the MSMA communication device processor may perform the operations of identifying potentially interfering frequency bands for all frequency bands available to the second RAT, not just the currently selected frequency band. Such embodiments remove the possibility of interference even when the second RAT changes frequency bands (e.g., in a cell handoff operation). FIG. 5B illustrates a method 550 for implementing a smart band selection algorithm with a processor (e.g., the general processor 206 of FIG. 2, the baseband modem processor 216, the coexistence management unit 230, a separate controller, and/or the like) executing on a two-RAT MSMA communication device (e.g., the MSMA communication device 200) to avoid a coexistence event between any frequency bands available to the first RAT and a second RAT. Thus, with reference to FIGS. 1-5B, the device processor may begin performing operations of the method 550 in response to the MSMA communication device's powering on in block 501.

Operations in blocks 502-506 in the method 550 may be performed by the device processor in a manner similar to those of like numbered blocks in the method 500. In block 530, the device processor may determine all of the frequency bands available to the second RAT, such as by accessing that RAT's acquisition database. In block 532, the device processor may perform a table look up using a table of interfering frequency bands comparing every frequency band available to the second RAT with every frequency band available to the first RAT to identify interfering frequency bands within the frequency bands available to the first RAT. In determination block 534, the device processor may determine, based on the results of the table look up operation in block 532, whether there is a possibility of interference between any of the second RAT's available frequencies and any of the first RAT's available frequencies.

In response to determining that there is no possibility for frequency band interference (i.e., determination block 534="No"), the device processor may configure the acquisition databases of the first RAT and the second RAT, respectively, to include all available frequency bands, in block 538. In the event that some frequency bands were previously removed to preclude interference, the operations in block 538 may include adding the previously removed frequency bands back into the respective acquisition databases. In the event all frequency bands are presently included in either or both RATs' respective acquisition database, no actions may be required in block 538.

In response to determining that there is at least one interfering frequency band combination among the frequency bands available to the first and second RATs (i.e., determination block 534="Yes"), the device processor may configure the acquisition database of the second RAT to include all of the second RAT's available frequency bands, in block 536, which, in some embodiments, may include adding back in previously removed frequency bands. The device processor may remove the identified interfering frequency bands from the acquisition database of the first RAT in block 516.

In block 540, both the first and second RATs will report to their respective networks the frequency bands included in their respective acquisition databases in the conventional manner. As described (e.g., with reference to FIG. 5A), in optional determination block 522, the device processor may determine whether there has been a change in status of either RAT, and if so, repeat the operations in the method 550 by again receiving information regarding the frequency bands available to the first and second RATs in block 502.

In some embodiments, the first RAT's and the second RAT's respective networks may each use the list of frequency bands included in the acquisition database to select a frequency band to use in performing a handoff operation. For example, a base station associated with the first RAT's network may be able to perform handoff operation from the first RAT's current frequency band, which has a poor signal, to any other frequency band included in the list of frequency bands available to the first RAT. Thus, by only including non-interfering frequency bands in the first RAT's acquisition database, the device processor may ensure that the first RAT's network does not cause the first RAT to perform a handover operation to an interfering frequency band. Further, because the first RAT sends the information about the non-interfering frequency bands included in its acquisition database during its normal course of operations, the first RAT may avoid handoffs to interfering frequency bands without having to send additional messaging to the first RAT's network.

While the described embodiment descriptions (e.g., with reference to FIGS. 5A and 5B) refer a first RAT and a second RAT, a device processor may perform operations similar to those described above to avoid potential coexistence events among three or more RATs on the MSMA communication device. Thus, in such embodiments, the device processor may receive information regarding available frequency bands for multiple RATs in block 502, select one or more of the multiple RATs in block 504, determine the available frequency bands of the one or more selected RATs in block 506, determine a current (or every) frequency band of one or more non-selected RATs in the multiple RATs in block 508, and perform a table lookup of the frequency bands available to the one or more selected RATs and the current (or all) frequency bands of the one or more non-selected RATs in a table of interfering frequency bands in block 510. The device processor may also determine whether there is a possibility of frequency band interference between any of the multiple RATs in determination block 512 based on the table lookup and may configure the acquisition databases of the one or more of the selected RATs to include only non-interfering frequency bands, in block 516, in response to determining that there is a possibility of frequency band interference.

Figure 6:
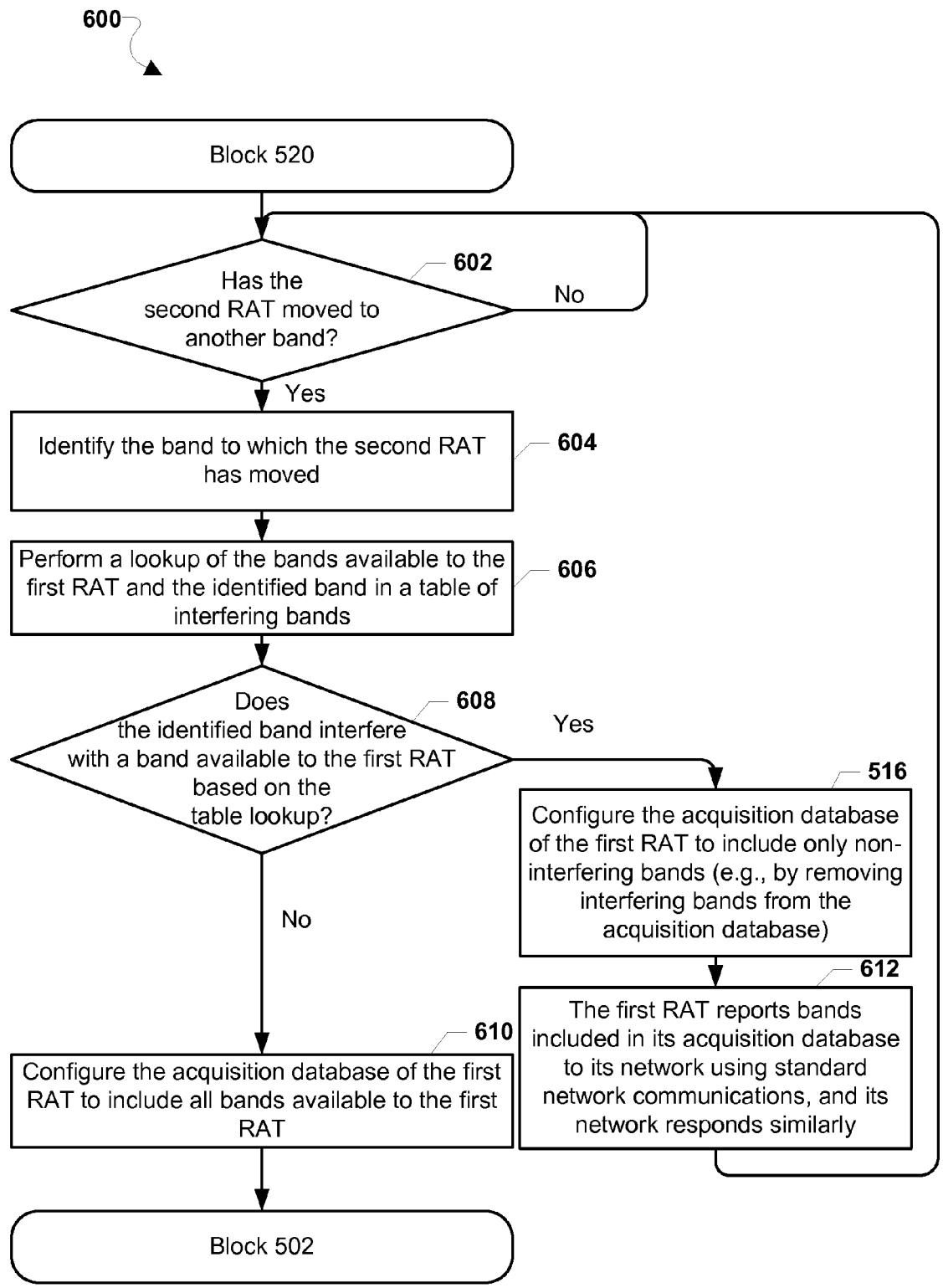
FIG. 6 is a process flow diagram illustrating a method for configuring a selected RAT (e.g., a first RAT) to change the frequency bands included in its acquisition database in response to detecting that a second RAT has moved to another frequency band according to various embodiments.

FIG. 6 illustrates a method 600 that may be implemented by a processor (e.g., the general processor 206 of FIG. 2, the baseband modem processor 216, the coexistence management unit 230, a separate controller, and/or the like) of a MSMA communication device (e.g., the MSMA communication device 200) for determining whether bands in the first RAT's acquisition database interfere with the second RAT's current frequency band in response to determining that the second RAT has moved to another frequency band. The operations of the method 600 implement embodiments of the operations of optional determination block 522 of the method 500 described with reference to FIG. 5A. Thus, with reference to FIGS. 1-6, the device processor may begin performing the operations of the method 600 in response to the first RAT and second RAT reporting the frequency bands in their acquisition databases to their respective networks during their normal course of operations (block 520).

In some embodiments, as part of its ordinary course of operations, the second RAT may move to another frequency band, such as in response to receiving instructions from its network to perform a handover operation to a frequency band that provides a higher quality of service (e.g., a frequency band of another cell tower). However, by moving to another frequency band, the second RAT may create the possibility of a coexistence event occurring between the second RAT and the first RAT because the first RAT's acquisition database may include bands that interfere with the second RAT's newly acquired frequency band. Therefore, to continue avoiding potential coexistence events, the device processor may dynamically determine whether the first RAT's acquisition database includes interfering frequency bands as a result of the second RAT's moving to another frequency band. In other embodiments (e.g., as described with reference to FIG. 5B), the second RAT may remove the possibility of a coexistence event occurring because the second RAT's newly acquired frequency band does not interfere with bands available to the first RAT, in which case the first RAT may be able to utilize any of its available frequency bands without interfering with the second RAT's newly acquired frequency band.

In response to determining that the second RAT has not moved to another frequency band (i.e., determination block 602="No"), the device processor may repeat the operations in determination block 602 until the processor determines that the second RAT has moved to another frequency band. In response to determining that the second RAT has moved to another frequency band (i.e., determination block 602="Yes"), the device processor may identify the frequency band to which the second RAT has moved, in block 604. For example, the device processor may request the identity of the frequency band from the second RAT directly, from the second RAT's network, etc.

In block 606, the device processor may perform a table lookup of the frequency bands available to the first RAT and the identified frequency band in a table of interfering frequency bands. In some embodiments, the operations of block 606 may be similar to the operations of block 510 of the method 500 (e.g., as described with reference to FIG. 5A). For example, the device processor may crosscheck the identified band against a list of the first RAT's available frequency bands to determine whether one or more of the available frequency bands will interfere with the identified band. Based on the table lookup performed in block 606, the device processor may determine whether the identified band interferes with the frequency bands available to the first RAT, in determination block 608.

In response to determining that the identified band does not interfere with the frequency bands available to the first RAT based on the table lookup (i.e., determination block 608="No"), the device processor may configure the acquisition database of the first RAT to include all frequency bands available to the first RAT, in block 610. In other words, in response to determining that the first RAT's available frequency bands will not interfere with the second RAT's identified band, the device processor may configure the first RAT to perform normally. In some embodiments (not shown), the first RAT may report all available frequency bands to its network as part of its normal operations, thereby enabling the first RAT's network to instruct the first RAT to perform handover operations to any available frequency band without the risk of a coexistence event occurring between the first RAT and the second RAT. The device processor may continue by obtaining updated information of available frequency bands for the first RAT and the second RAT in block 502 of the method 500.

In response to determining that the identified band interferes with the frequency bands available to the first RAT based on the table lookup (i.e., determination block 608="Yes"), the device processor may configure the acquisition database of the first RAT to include only non-interfering frequency bands in block 516 (e.g., as described with reference to the method 500). For example, the device processor may remove the frequency bands that interfere with the identified band from the first RAT's acquisition database or may include only non-interfering frequency bands in an empty acquisition database for the first RAT.

In block 612, the first RAT may report bands included in its acquisition database (i.e., the non-interfering frequency bands included in the acquisition database as a result of the operations performed in block 516) to its network via typical/normal communication protocols, and the first RAT's network may respond similarly. In some embodiments, the operations performed in block 612 may be similar to those operations performed in block 520 of the method 500 (e.g., as described with reference to FIG. 5A).

The device processor may repeat the operations described above in a loop by determining whether the second RAT has move to yet another frequency band in determination block 602.

Figure 7:
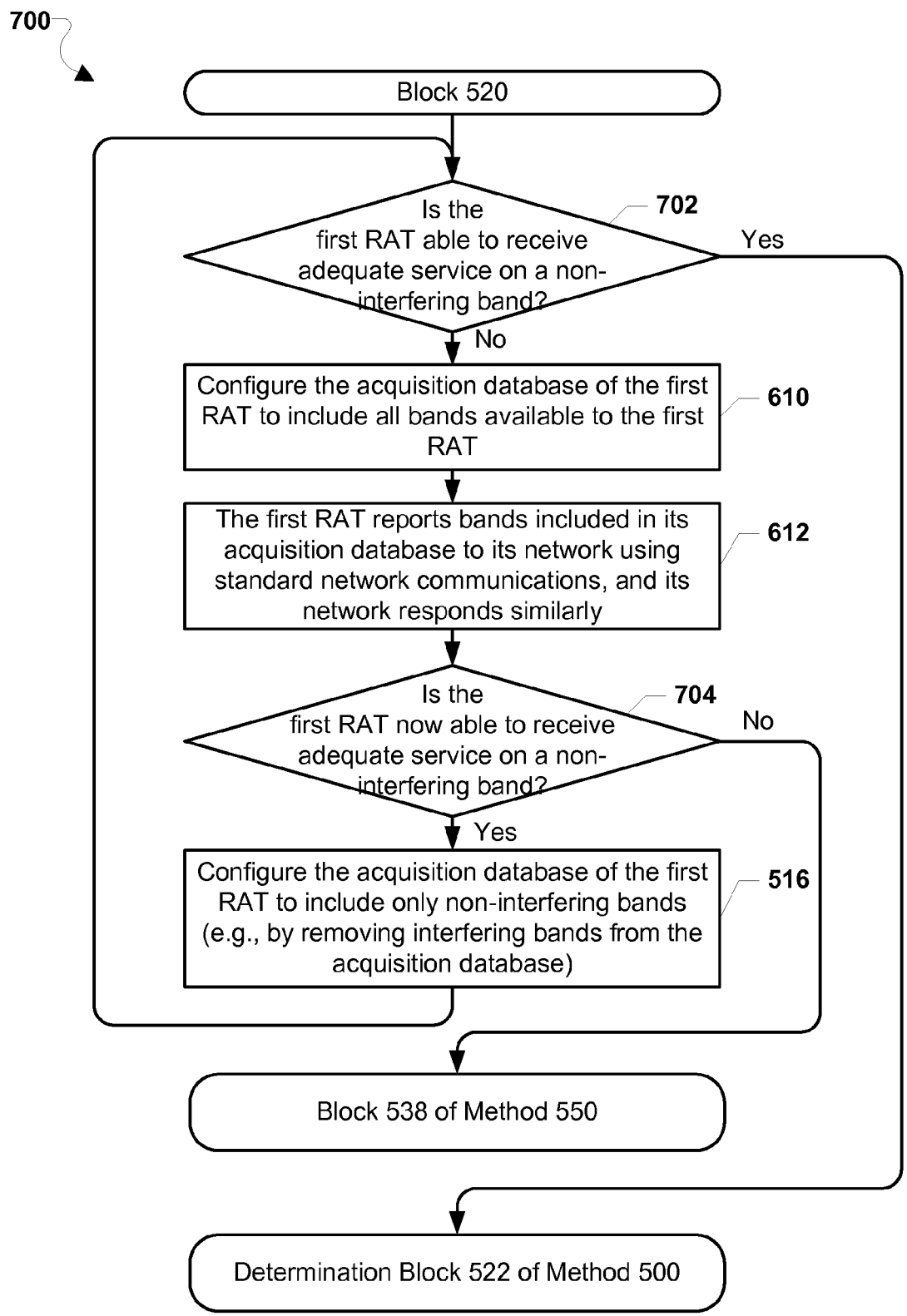
FIG. 7 is a process flow diagram illustrating a method for configuring a selected RAT (e.g., a first RAT) to resume normal operations in response to determining that the selected RAT is unable to receive adequate services on a non-interfering frequency band according to various embodiments.

FIG. 7 illustrates a method 700 that may be implemented by a processor (e.g., the general processor 206 of FIG. 2, the baseband modem processor 216, the coexistence management unit 230, a separate controller, and/or the like) executing on a MSMA communication device (e.g., the MSMA communication device 200) for configuring the first RAT to include all available frequency bands in its acquisition when the first RAT is unable to maintain an adequate quality of service with any of its non-interfering frequency bands. The operations of the method 700 implement some embodiments of the operations of optional determination block 522 of the method 500 described with reference to FIG. 5A. Thus, with reference to FIGS. 1-7, the device processor may begin performing the operations of the method 700 in response to the first RAT's reporting the frequency bands in its acquisition databases to its network in block 520 of the method 500 during the normal course of the first RAT's operations.

In some embodiments, in the event that the first RAT is configured to include only non-interfering frequency bands in its acquisition database as described, the first RAT may experience inadequate service on each of its non-interfering frequency bands because of poor signal strength, for example. In such embodiments, the device processor may temporarily configure the first RAT to be able to use any available frequency band in an attempt to improve the first RAT's service until the first RAT is able to acquire adequate service with a non-interfering frequency band.

Thus, in determination block 702, the device processor may determine whether the first RAT is able to receive adequate service on a non-interfering frequency band. In some embodiments, the device processor may keep track of the non-interfering frequency bands on which the first RAT has attempted to acquire service, and the processor may determine that the RAT is unable to receive adequate service, for example, in the event that the first RAT has attempted to acquire service with each non-interfering frequency band a threshold number of times. In some embodiments, the device processor may receive information from the first RAT indicating whether the first RAT is able to receive adequate service on any non-interfering frequency band.

In response to determining that the first RAT is able to receive adequate service on a non-interfering frequency band (i.e., determination block 702="Yes"), the device processor may repeat the operations of monitoring for a change in status of one or both of the RATs in optional determination block 522 of the method 500.

Thus, in response to determining that the first RAT is unable to receive adequate service on a non-interfering frequency band (i.e., determination block 702="No"), the device processor may configure the acquisition database of the first RAT to include all frequency bands that are available to the first RAT, in block 610 (e.g., as described with reference to FIG. 6). The first RAT may report the frequency bands included in its acquisitions database (i.e., all available frequency bands) to its network according to normal/standard processes, and the first RAT's network may respond similarly. In some embodiments, by configuring the first RAT's acquisition database to include all available frequency bands, the device processor may enable the first RAT to utilize all available frequencies in its efforts to acquire adequate service. Further, as the first RAT reports support for all available frequency bands during its ordinary course of operation, the first RAT's network may be able to identify a frequency band (e.g., an interfering frequency band) on which the first RAT may acquire adequate service, and the first RAT's network may instruct the first RAT to perform a handover operation to begin acquiring service on that identified band.

In determination block 704, the device processor may determine whether the first RAT is now able to receive adequate service on a non-interfering frequency band. In other words, the device processor may determine whether, over time, the signal strength or coverage of a non-interfering frequency band has improved to the point that the first RAT may receive adequate service with that non-interfering frequency band. In some embodiments, the device processor may perform the operations in determination block 704 as described in determination block 702, such as by obtaining information from the first RAT regarding the service potential of the non-interfering frequency bands.

In response to determining that the first RAT is now able to receive adequate service on a non-interfering frequency band (i.e., determination block 704="Yes"), the device processor may configure the acquisition database of the first RAT to include only non-interfering frequency bands, in block 516 (e.g., as described with reference to the method 500). Thus, in some embodiments, the device processor may enable the first RAT to use bands that interfere with the second RAT only as long as necessary—such as until the first RAT is able to receive adequate service on a non-interfering frequency band—thereby minimizing the effects of any coexistence events that may occur while the first RAT is unable to receive adequate service on a non-interfering frequency band. The device processor may also repeat the operations described above by again determining whether the first RAT is able to receive adequate service on a non-interfering frequency band in determination block 702.

In response to determining that the first RAT is still unable to receive adequate service on a non-interfering frequency band (i.e., determination block 704="No"), the process may revert to convention methods for managing de-sense, such as through transmit and/or receive blanking, by populating both RATs' acquisition databases with all available frequency bands, such as by performing the operations in block 538 of the method 550. In some embodiments, the processor device may wait a threshold period of time before determining in determination block 704 that the first RAT is still unable to acquire adequate service with a non-interfering frequency band.

In some embodiments, the device processor may select the RAT that was not previously selected (i.e., the second RAT) because the currently selected RAT (i.e., the first RAT) is unable to maintain adequate service with a non-interfering frequency band. As a result, the device processor may attempt to avoid the possibility of frequency band interference by configuring the acquisition database of the second RAT to include only frequency bands that do not interfere with the first RAT's available bands in case the second RAT is able to maintain adequate service on a non-interfering frequency band, whereas the first RAT was unable to maintain adequate service.

Figure 8:
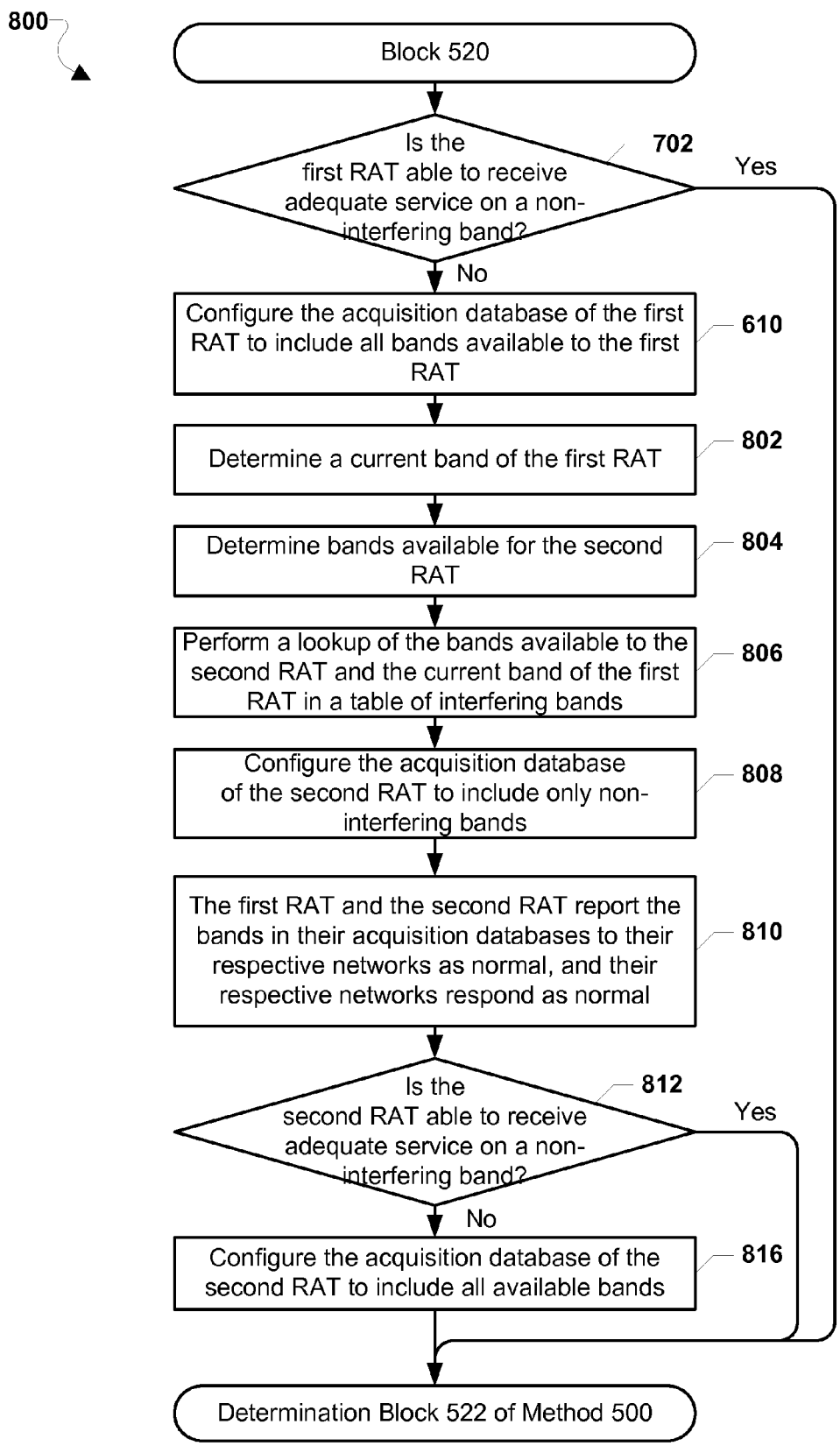
FIG. 8 is a process flow diagram illustrating a method for configuring a first RAT to resume normal operations and configuring a second RAT to utilize only bands that do not interfere with the first RAT in response to determining that the first RAT is unable to receive adequate services on a frequency band that does not interfere with a frequency band of the second RAT according to various embodiments.

FIG. 8 illustrates a method 800 that may be implemented by a processor (e.g., the general processor 206 of FIG. 2, the baseband modem processor 216, the coexistence management unit 230, a separate controller, and/or the like) executing on a MSMA communication device (e.g., the MSMA communication device 200) for avoiding potential band interference by configuring a second RAT to trim its acquisition database of frequency bands that interfere with frequency bands of a first RAT in response to determining that the first RAT is unable to maintain adequate service using only non-interfering frequency bands. The operations of the method 800 implement some embodiments of the operations of optional determination block 522 of the method 500 as described with reference to FIG. 5A. Thus, with reference to FIGS. 1-8, the device processor may begin performing the operations of the method 800 in response to the first RAT's reporting the frequency bands in its acquisition database to its network in block 520 of the method 500 during the normal course of the first RAT's operations.

As described, the first RAT may be unable to maintain an adequate service using a non-interfering frequency band, for example, because the first RAT's non-interfering frequency bands have poor signals or there is poor coverage of the non-interfering frequency bands. While the device processor may determine whether the first RAT's non-interfering frequency bands are able to provide adequate service at some later time (e.g., as described with reference to FIG. 7), in some embodiments, the processor may configure the first RAT to revert to standard operations and may configure the second RAT to begin utilizing only non-interfering frequency bands. In other words, the device processor may essentially cause the second RAT and the first RAT to trade places. As a result, the first RAT may have a higher likelihood of obtaining satisfactory service while continuing to avoid the possibility of frequency band interference/coexistence events with the second RAT.

In determination block 702, the device processor may determine whether the first RAT is able to receive adequate service on a non-interfering frequency band (e.g., as described above in the method 700). In response to determining that the first RAT is able to receive adequate service on a non-interfering frequency band (i.e., determination block 702="Yes"), the device processor may repeat the operations of monitoring for a change in status of one or both of the RATs in optional determination block 522 of the method 500.

In response to determining that the first RAT is unable to receive adequate service on a non-interfering frequency band (i.e., determination block 702="No"), the device processor may configure the acquisition database of the first RAT to include all frequency bands available to the first RAT in block 610. As a result, the first RAT may be able to acquire adequate service via an interfering frequency band with a strong signal through standard processes, such as by reporting support for all available frequency bands to its network via standard communications and receiving handover instructions from the network to begin using the interfering frequency band.

In block 802, the device processor may identify a current frequency band of the first RAT. In some embodiments, the device processor may identify the first RAT's current frequency band when the first RAT acquires a frequency band that provides adequate service. Because the first RAT is unable to receive adequate service on a non-interfering frequency band, the first RAT may need to acquire service via a frequency band that interferes with the second RAT's current frequency band, thereby increasing the likelihood that a potential coexistence event may occur between the first RAT's current frequency band and the second RAT's current frequency band.

The device processor may determine the frequency bands available to the second RAT in block 804, such as by referring to the information obtained in block 502 of the method 500. In block 806, the device processor may perform a table lookup of the frequency bands available to the second RAT and the current frequency band of the first RAT in a table of interfering frequency bands (e.g., the frequency interference data table 425). In some embodiments, the operations of block 806 may be similar to the operations of block 510 of the method 500. For example, the device processor may crosscheck the first RAT's current frequency band against the second RAT's available frequency bands to identify the second RAT's bands that interfere with the first RAT's current frequency band.

Thus, in block 808, the device processor may configure the acquisition database of the second RAT to include only non-interfering frequency bands, for example, by removing frequency bands determined to interfere with the first RAT's current frequency band or by adding only non-interfering frequency bands to the second RAT's empty acquisition database.

In block 810, the second RAT may send a report to its network as a part of its ordinary/typical operations. Because the acquisition database of the second RAT only includes non-interfering bands as a result of the operations performed in block 808, the second RAT may only report support for frequency bands that do not interference with the first RAT's current band. The first RAT may similarly send a report to its network as a part of its normal/typical operations indicating that the first RAT supports all available frequency bands. In other embodiments of the operations performed in block 810, the respective networks of the first RAT and the second RAT may also respond via standard/normal communications.

In determination block 812, the device processor may determine whether the second RAT is able to receive adequate service on a non-interfering frequency band included in its acquisition database, such as by performing operations substantially similar to those described above with reference to the first RAT in determination block 702 of the method 700. Thus, in some embodiments, the device processor may monitor the second RAT to determine whether it is possible for the second RAT to maintain service when limited to utilizing only non-interfering frequency bands.

In response to determining that the second RAT is unable to receive adequate service on a non-interfering frequency band (i.e., determination block 812="No"), the device processor may configure the acquisition database of the second RAT to include all frequency bands available to the second RAT. In other words, when the device processor recognizes that the second RAT is unable to function adequately on any non-interfering frequency band, the processor may configure the second RAT to resume normal operations. In some embodiments, as a result of resuming its normal operations, the second RAT may report that it has support for all available RATs to its network, its network may respond using standard messaging, and the second RAT and its network may resume standard processes to coordinate communication channels.

In response to determining that the second RAT is able to receive adequate service on a non-interfering frequency band (i.e., determination block 812="Yes") or in response to configuring the acquisition database of the second RAT to include all available bands in block 816, the device processor may repeat the operations of monitoring for a change in status of one or both of the RATs in optional determination block 522 of the method 500.

Figure 9:
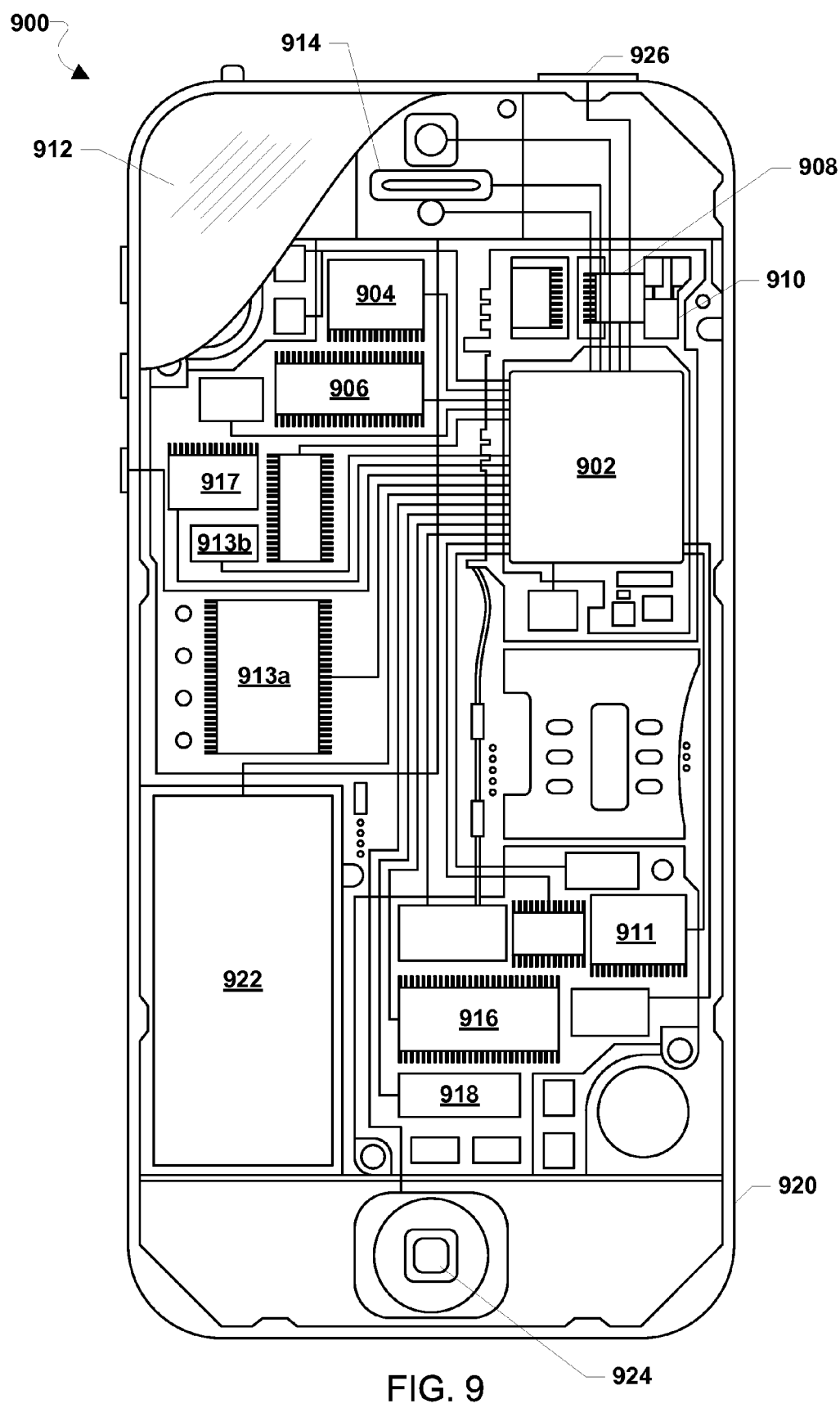
FIG. 9 is a component block diagram of a multi-SIM-multi-active communication device suitable for implementing some embodiment methods.

Various embodiments may be implemented in any of a variety of MSMA communication devices, an example on which (e.g., MSMA communication device 900) is illustrated in FIG. 9. According to various embodiments, the MSMA communication device 900 may be similar to the MSMA communication devices 110, 120, 200 as described above with reference to FIGS. 1-3. As such, the MSMA communication device 900 may implement the methods 500, 550, 600, 700, 800 (FIGS. 5A-8).

The MSMA communication device 900 may include a processor 902 coupled to a touchscreen controller 904 and an internal memory 906. The processor 902 may be one or more multi-core integrated circuits designated for general or specific processing tasks. The internal memory 906 may be volatile or non-volatile memory, and may also be secure and/or encrypted memory, or unsecure and/or unencrypted memory, or any combination thereof. The touchscreen controller 904 and the processor 902 may also be coupled to a touchscreen panel 912, such as a resistive-sensing touchscreen, capacitive-sensing touchscreen, infrared sensing touchscreen, etc. Additionally, the display of the MSMA communication device 900 need not have touch screen capability.

The MSMA communication device 900 may have one or more cellular network transceivers 908, 916 coupled to the processor 902 and to two or more antennae 910, 911 and configured for sending and receiving cellular communications. The transceivers 908, 916 and the antennae 910, 911 may be used with the above-mentioned circuitry to implement the various embodiment methods. The MSMA communication device 900 may include two or more SIM cards 913a, 913b coupled to the transceivers 908, 916 and/or the processor 902 and configured as described above. The MSMA communication device 900 may include a cellular network wireless modem chip 917 that enables communication via a cellular network and is coupled to the processor 902.

The MSMA communication device 900 may also include speakers 914 for providing audio outputs. The MSMA communication device 900 may also include a housing 920, constructed of a plastic, metal, or a combination of materials, for containing all or some of the components discussed herein. The MSMA communication device 900 may include a power source 922 coupled to the processor 902, such as a disposable or rechargeable battery. The rechargeable battery may also be coupled to the peripheral device connection port to receive a charging current from a source external to the MSMA communication device 900. The MSMA communication device 900 may also include a physical button 924 for receiving user inputs. The MSMA communication device 900 may also include a power button 926 for turning the MSMA communication device 900 on and off.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for avoiding coexistence interference between radio access technologies (RATs) operating on a multi-subscription, multi-active communication device, comprising:
   obtaining information regarding available frequency bands for a first RAT and a second RAT;
   determining whether there is a possibility of frequency band interference between the first RAT and the second RAT;
   configuring an acquisition database of the first RAT to include only non-interfering frequency bands, in response to determining that there is the possibility of frequency band interference between the first RAT and the second RAT;
   determining whether there is any band available to the first RAT that meets a quality of service threshold and that does not interfere with a current frequency band of the second RAT; and
   further configuring the acquisition database of the first RAT to include all frequency bands available to the first RAT, in response to determining that there is not a band available to the first RAT that meets the quality of service threshold and that does not interfere with the current frequency band of the second RAT.

2. The method of claim 1, wherein configuring the acquisition database of the first RAT to include only non-interfering frequency bands comprises removing interfering frequency bands from the acquisition database of the first RAT before the first RAT reports available frequency bands to a wireless network.

3. The method of claim 1, wherein configuring the acquisition database of the first RAT to include only non-interfering frequency bands comprises removing from the acquisition database of the first RAT any frequency bands that interfere with the current frequency band of the second RAT.

4. The method of claim 1, wherein configuring the acquisition database of the first RAT to include only non-interfering frequency bands comprises removing from the acquisition database of the first RAT any frequency bands of the first RAT that will interfere with any frequency band available to the second RAT.

5. The method of claim 1, wherein determining whether there is a possibility of frequency band interference between the first RAT and the second RAT comprises:
   performing a table lookup of frequency bands available to the first RAT and the current frequency band of the second RAT in a table of interfering frequency bands; and
   determining whether there is the possibility of frequency band interference between the first RAT and the second RAT based on the table lookup.

6. The method of claim 1, further comprising:
   identifying a frequency band to which the second RAT has moved, in response to the second RAT changing its current frequency band;
   performing a table lookup of frequency bands available to the first RAT and the identified frequency band in a table of interfering frequency bands;
   determining whether the identified frequency band will interfere with a frequency band available to the first RAT based on the table lookup; and
   configuring the acquisition database of the first RAT to include all frequency bands available to the first RAT, in response to determining that the identified frequency band will not interfere with a frequency band available to the first RAT.

7. The method of claim 6, further comprising configuring the acquisition database of the first RAT to include only frequency bands that will not interfere with the identified frequency band, in response to determining that the identified frequency band will interfere with a frequency band available to the first RAT.

8. The method of claim 1, further comprising:
   determining again whether there is any band available to the first RAT that meets the quality of service threshold and that does not interfere with the current frequency band of the second RAT; and
   configuring the acquisition database of the first RAT to include only frequency bands that do not interfere with the current frequency band of the second RAT, in response to determining that there is a band available to the first RAT that meets the quality of service threshold and that does not interfere with the current frequency band of the second RAT.

9. The method of claim 1, further comprising:
   performing a table lookup of frequency bands available to the second RAT and the current frequency band of the first RAT in a table of interfering frequency bands, in response to determining that there is not a band available to the first RAT that meets the quality of service threshold and that does not interfere with the current frequency band of the second RAT; and
   configuring an acquisition database of the second RAT to include only bands that do not interfere with the current frequency band of the first RAT.

10. The method of claim 9, further comprising:
    determining whether there is any band available to the second RAT that meets the quality of service threshold and that does not interfere with the current frequency band of the first RAT; and
    configuring the acquisition database of the second RAT to include all frequency bands available to the second RAT, in response to determining that there is no band available to the second RAT that meets the quality of service threshold and that does not interfere with the current frequency band of the first RAT.

11. The method of claim 1, wherein the first RAT is different than the second RAT.

12. The method of claim 1, further comprising:
    obtaining information regarding available frequency bands for a third RAT;
    determining whether there is a possibility of frequency band interference between the first RAT and at least one of the second RAT or the third RAT; and
    configuring the acquisition database of the first RAT to include only non-interfering frequency bands, in response to determining that there is the possibility of frequency band interference between the first RAT and at least one of the second RAT or the third RAT.

13. The method of claim 12, wherein configuring the acquisition database of the first RAT to include only non-interfering frequency bands comprises removing from the acquisition database of the first RAT any frequency bands that interfere with a current frequency band of at least one of the second RAT or the third RAT.

14. The method of claim 12, wherein configuring the acquisition database of the first RAT to include only non-interfering frequency bands comprises removing from the acquisition database of the first RAT any frequency bands of the first RAT that will interfere with any frequency band available to at least one of the second RAT or the third RAT.

15. The method of claim 12, wherein determining whether there is a possibility of frequency band interference between the first RAT and at least one of the second RAT or the third RAT comprises:
performing a table lookup of frequency bands available to the first RAT and a current frequency band of at least one of the second RAT or the third RAT in a table of interfering frequency bands; and
determining whether there is the possibility of frequency band interference between the first RAT and at least one of the second RAT or the third RAT based on the table lookup.

16. The method of claim 12, further comprising:
identifying a frequency band to which at least one of the second RAT or the third RAT has moved in response to at least one of the second RAT or the third RAT changing its current frequency band;
performing a table lookup of frequency bands available to the first RAT and the identified frequency band in a table of interfering frequency bands;
determining whether the identified frequency band will interfere with a frequency band available to the first RAT based on the table lookup; and
configuring the acquisition database of the first RAT to include all frequency bands available to the first RAT in response to determining that the identified frequency band will not interfere with a frequency band available to the first RAT.

17. The method of claim 16, further comprising configuring the acquisition database of the first RAT to include only frequency bands that will not interfere with the identified frequency band in response to determining that the identified frequency band will interfere with a frequency band available to the first RAT.

18. The method of claim 17, further comprising:
determining whether there is any band available to the first RAT that meets the quality of service threshold and that does not interfere with a current frequency band of the third RAT; and
configuring the acquisition database of the first RAT to include all frequency bands available to the first RAT in response to determining that there is no band available to the first RAT that meets the quality of service threshold and that does not interfere with the current frequency band of the third RAT.

19. The method of claim 12, wherein each of the first RAT, the second RAT, and the third RAT are different RATs.

20. A multi-subscription, multi-active communication device, comprising:
a memory;
a plurality of radio access technologies (RATs); and
a processor coupled to the memory and the plurality of RATs, wherein the processor is configured to:
obtain information regarding available frequency bands for a first RAT and a second RAT;
determine whether there is a possibility of frequency band interference between the first RAT and the second RAT;
configure an acquisition database of the first RAT to include only non-interfering frequency bands, in response to determining that there is the possibility of frequency band interference between the first RAT and the second RAT;
determine whether there is any band available to the first RAT that meets a quality of service threshold and that does not interfere with a current frequency band of the second RAT; and
further configure the acquisition database of the first RAT to include all frequency bands available to the first RAT, in response to determining that there is not a band available to the first RAT that meets the quality of service threshold and that does not interfere with the current frequency band of the second RAT.

21. The multi-subscription, multi-active communication device of claim 20, wherein the processor is further configured to remove interfering frequency bands from the acquisition database of the first RAT before the first RAT reports available frequency bands to a wireless network.

22. The multi-subscription, multi-active communication device of claim 20, wherein the processor is further configured to remove from the acquisition database of the first RAT any frequency bands that interfere with the current frequency band of the second RAT.

23. The multi-subscription, multi-active communication device of claim 20, wherein the processor is further configured to remove from the acquisition database of the first RAT any frequency bands of the first RAT that will interfere with any frequency band available to the second RAT.

24. The multi-subscription, multi-active communication device of claim 20, wherein the processor is further configured to:
perform a table lookup of frequency bands available to the first RAT and the current frequency band of the second RAT in a table of interfering frequency bands; and
determine whether there is the possibility of frequency band interference between the first RAT and the second RAT based on the table lookup.

25. The multi-subscription, multi-active communication device of claim 20, wherein the processor is further configured to:
identify a frequency band to which the second RAT has moved, in response to the second RAT changing its current frequency band;
perform a table lookup of frequency bands available to the first RAT and the identified frequency band in a table of interfering frequency bands;
determine whether the identified frequency band will interfere with a frequency band available to the first RAT based on the table lookup;
configure the acquisition database of the first RAT to include all frequency bands available to the first RAT, in response to determining that the identified frequency band will not interfere with a frequency band available to the first RAT; and
configure the acquisition database of the first RAT to include only frequency bands that will not interfere with the identified frequency band, in response to determining that the identified frequency band will interfere with a frequency band available to the first RAT.

26. The multi-subscription, multi-active communication device of claim 20, wherein the processor is further configured to:
perform a table lookup of frequency bands available to the second RAT and a current frequency band of the first RAT in a table of interfering frequency bands, in response to determining that there is no band available to the first RAT that meets the quality of service threshold and that does not interfere with the current frequency band of the second RAT; and configure an acquisition database of the second RAT to include only bands that do not interfere with the current frequency band of the first RAT.

27. A non-transitory processor-readable storage medium having stored thereon processor-executable instructions configured to cause a processor of a multi-subscription, multi-active communication device to perform operations comprising:
- obtaining information regarding available frequency bands for a first RAT and a second RAT operating on the multi-subscription, multi-active communication device;
- determining whether there is a possibility of frequency band interference between the first RAT and the second RAT;
- configuring an acquisition database of the first RAT to include only non-interfering frequency bands, in response to determining that there is the possibility of frequency band interference between the first RAT and the second RAT;
- determining whether there is any band available to the first RAT that meets a quality of service threshold and that does not interfere with a current frequency band of the second RAT; and
- further configuring the acquisition database of the first RAT to include all frequency bands available to the first RAT, in response to determining that there is not a band available to the first RAT that meets the quality of service threshold and that does not interfere with the current frequency band of the second RAT.

28. A multi-subscription, multi-active communication device, comprising:
- means for obtaining information regarding available frequency bands for a first RAT and a second RAT operating on the multi-subscription, multi-active communication device means for determining whether there is a possibility of frequency band interference between the first RAT and the second RAT;
- means for configuring an acquisition database of the first RAT to include only non-interfering frequency bands, in response to determining that there is the possibility of frequency band interference between the first RAT and the second RAT;
- determining whether there is any band available to the first RAT that meets a quality of service threshold and that does not interfere with a current frequency band of the second RAT; and
- further configuring the acquisition database of the first RAT to include all frequency bands available to the first RAT, in response to determining that there is not a band available to the first RAT that meets the quality of service threshold and that does not interfere with the current frequency band of the second RAT.

* * * * *